US006288723B1

(12) United States Patent
Huff et al.

(10) Patent No.: US 6,288,723 B1
(45) Date of Patent: Sep. 11, 2001

(54) METHOD AND APPARATUS FOR CONVERTING DATA FORMAT TO A GRAPHICS CARD

(75) Inventors: Thomas Huff; Shreekant S. Thakkar, both of Portland, OR (US); Gregory C. Parrish, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/053,259

(22) Filed: Apr. 1, 1998

(51) Int. Cl.[7] .................................................. G06T 15/00
(52) U.S. Cl. ............................................ 345/433; 345/469
(58) Field of Search .................................... 708/204, 607, 708/191; 345/433, 431, 469, 418, 430, 432

(56) References Cited

U.S. PATENT DOCUMENTS

| | | | |
|---|---|---|---|
| 3,855,460 | * 12/1974 | Sado ...................................... | 708/204 |
| 4,697,247 | * 9/1987 | Grinberg et al. ..................... | 708/191 |
| 4,965,750 | * 10/1990 | Matsuo et al. ....................... | 345/431 |
| 5,109,524 | * 4/1992 | Wagner et al. ....................... | 712/42 |
| 5,226,002 | * 7/1993 | Wu et al. .............................. | 708/607 |
| 5,412,766 | * 5/1995 | Pietras et al. ........................ | 345/431 |
| 5,724,497 | * 3/1998 | San et al. .............................. | 345/469 |
| 5,798,767 | * 8/1998 | Poole et al. ........................... | 345/431 |

OTHER PUBLICATIONS

A Processor Architecture for 3–D Graphics Calculations, Yulun Wang, Amante Mangaser, Partha Srinivasan, Computer Motion, Inc., pp. 1–23.
Parallel Computers for Graphics Applications (Proceedings: Second International Conference . . .), Levinthal, et al., 1987. pp 193–198.
A SIMD Graphics Processor, Adam Levinthal, Thoms Porter, 1984, pp 77–82.
Visual Instruction Set (VIS) User's Guide, Sun Microsystems, Version 1. 1, Mar. 1997, pp i–xii, 1–127.
AMD–3D Technology Manual, Advance Micro Devices, (AMD), Feb. 1998, pp i–x, 1–58.
MIPS Extension for Digital Media With 3D, MIPS Techologies, Inc., Mar. 12, 1997, pp 0–26.
Architecture of a Braodband Mediaprocessor (Proceedings of COMPCON '96), Craig Hansen, 1996, pp 334–354.
64–bit and Multimedia Extensions in the PA–RISC 2.0 Architecture, Computing Directory Technologies Precision Architecture Document, Jul. 17, 1997.
Silicon Graphics Introduces Enhanced MIPS Architecture to Lead the Interactive Digital Revolution, Oct. 21, 1996.
21164 Alpha Microprocessor Data Sheet, Samsung Electronics, 1997.
TM1000 Preliminary Data Book, Philips Semidconductors, Jul. 1, 1997, pp A–74, A–133–138, A–161.
Visual Instruction Set (VIS) User's Guide, Sun Microsystems, Version 1.1, Mar. 1997, pp 1–xii. 1–127.
AMD–3D Technology Manual, Advance Micro Devices, (AMD), Feb. 1998, pp i–x, 1–58.
MIPS Extension for Digital Media With 3D, MIPS Technologies, Inc., Mar. 12, 1997, pp 0–26.

* cited by examiner

Primary Examiner—Cliff N. Vo
(74) Attorney, Agent, or Firm—Blakely, Sokoloff, Taylor & Zafman LLP

(57) ABSTRACT

An apparatus and method for performing conversion of graphical data format is disclosed. A matrix multiplication is performed on a first set of data and a second set of data to generate a third set of data in a first format. The first and second sets of data represent the graphical data. The third set of data in the first format is transmitted to a graphics card. The third set of data in the first format is converted to a converted set of data in a second format.

15 Claims, 17 Drawing Sheets

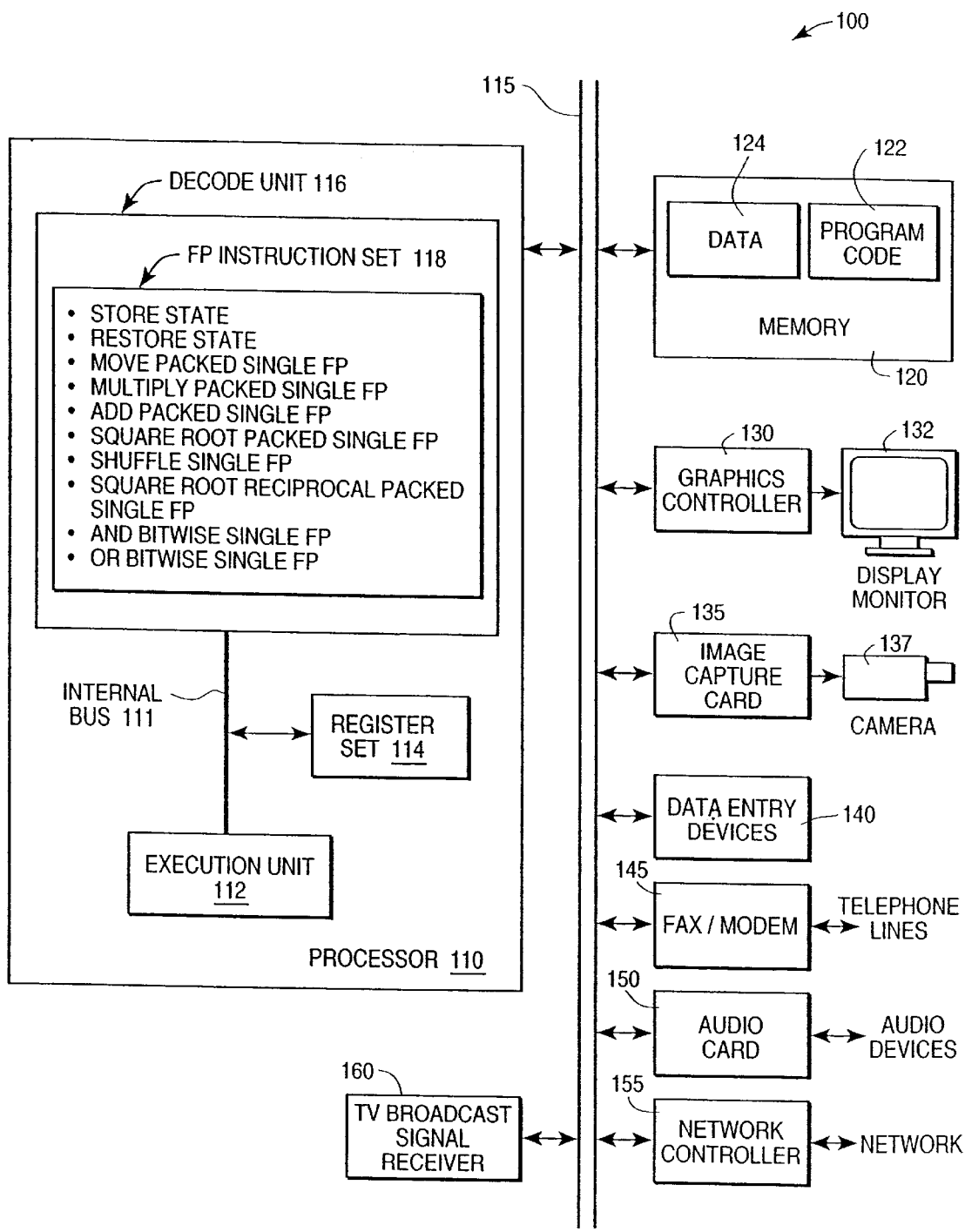
FIG_1

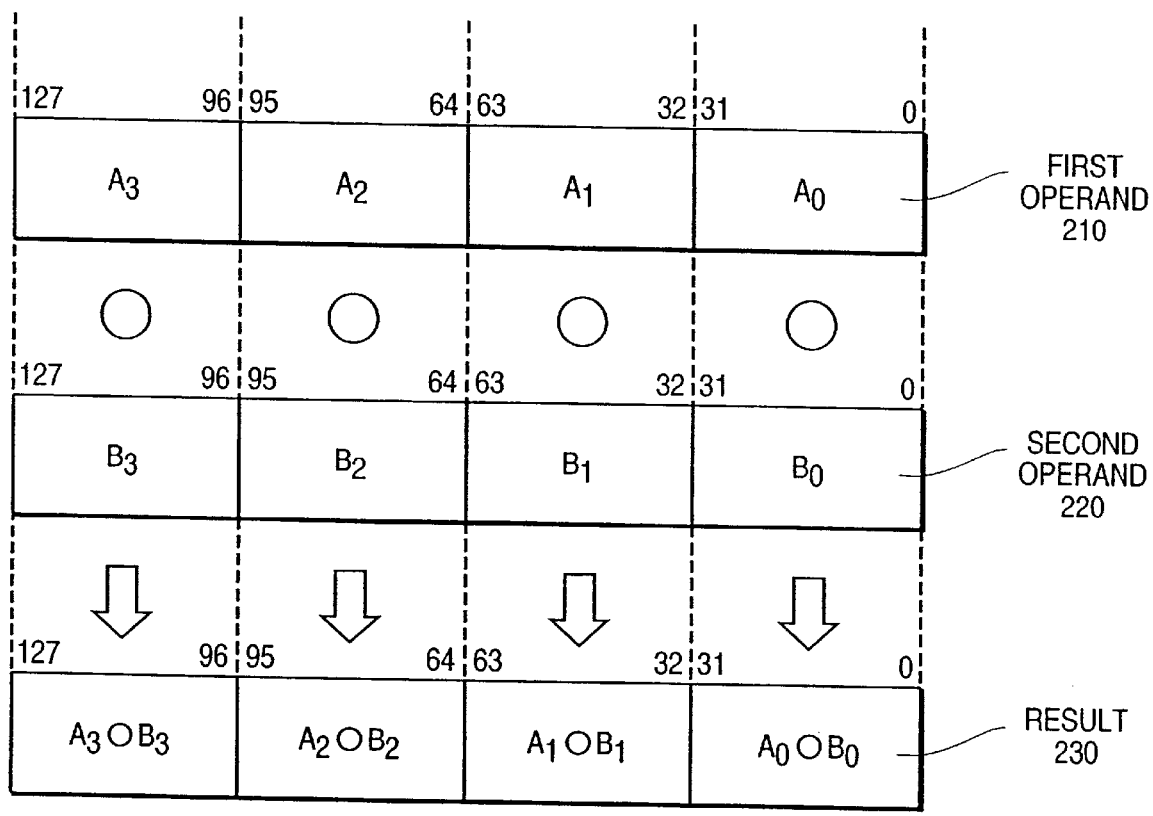
FIG_2

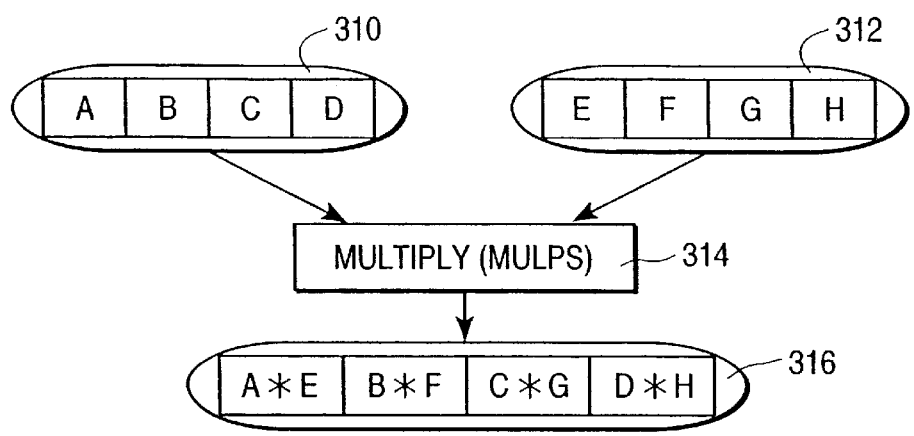
FIG_3A
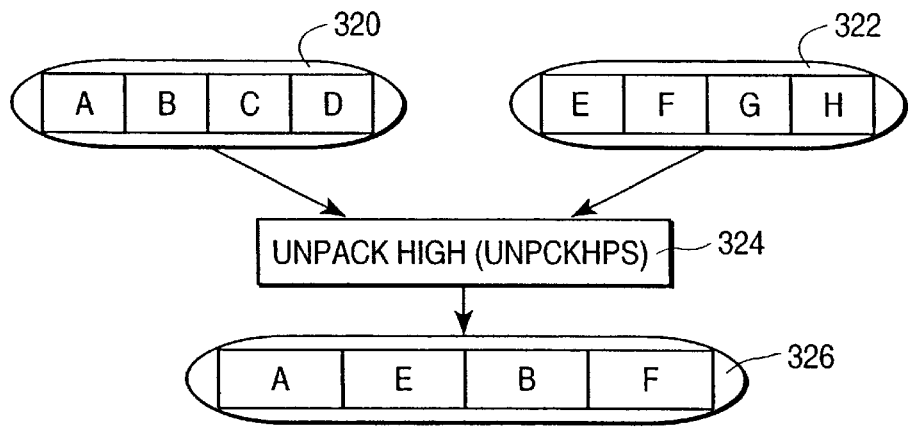
FIG_3B
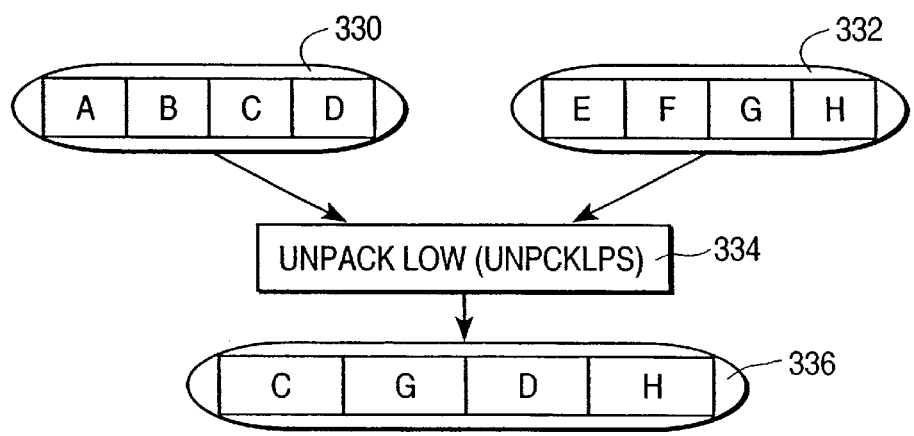
FIG_3C

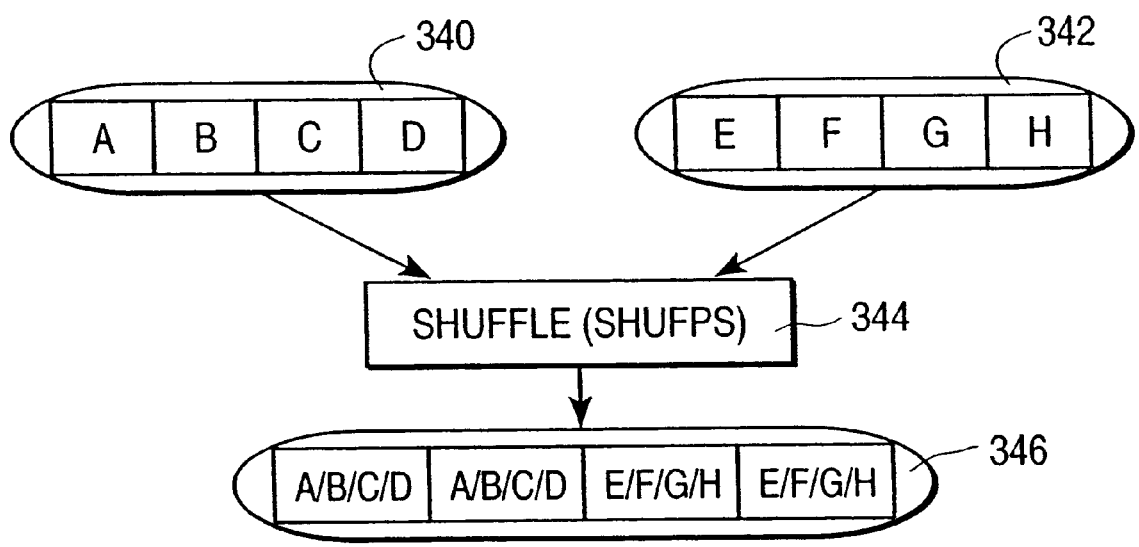
FIG_3D
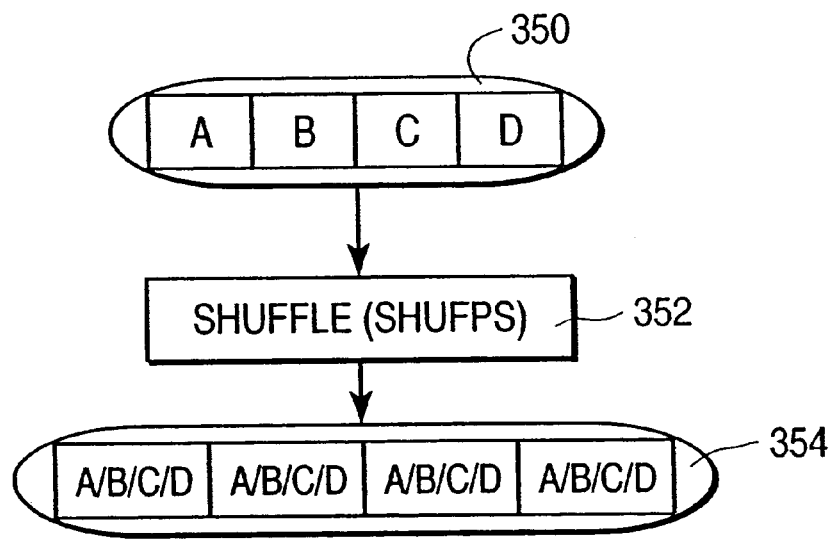
FIG_3E

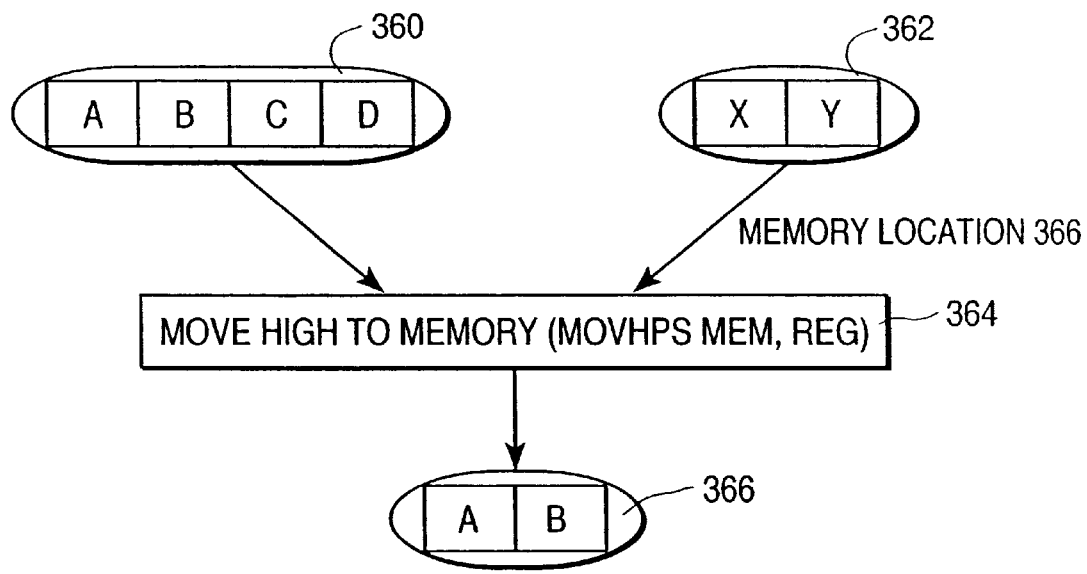
FIG_3F
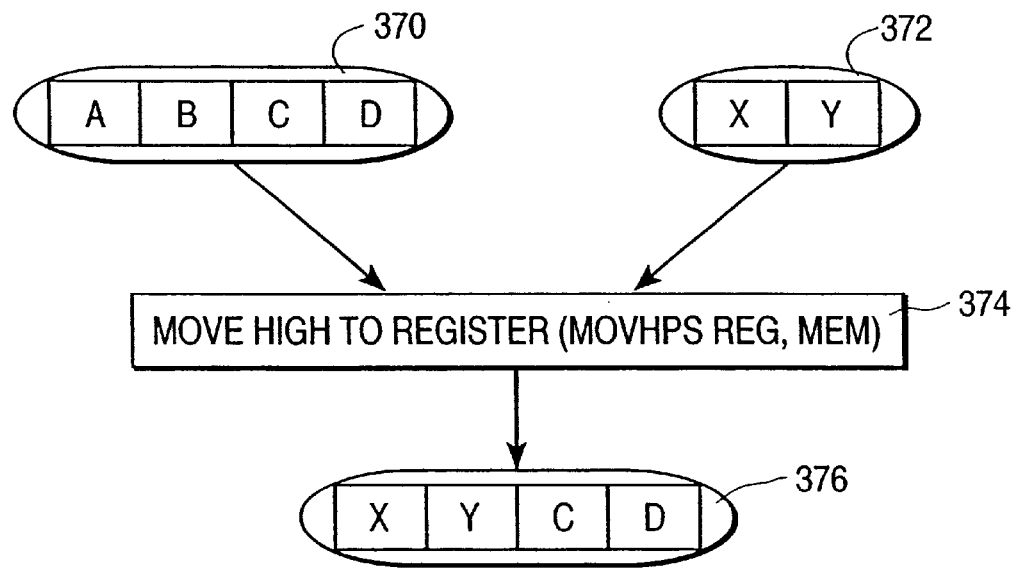
FIG_3G

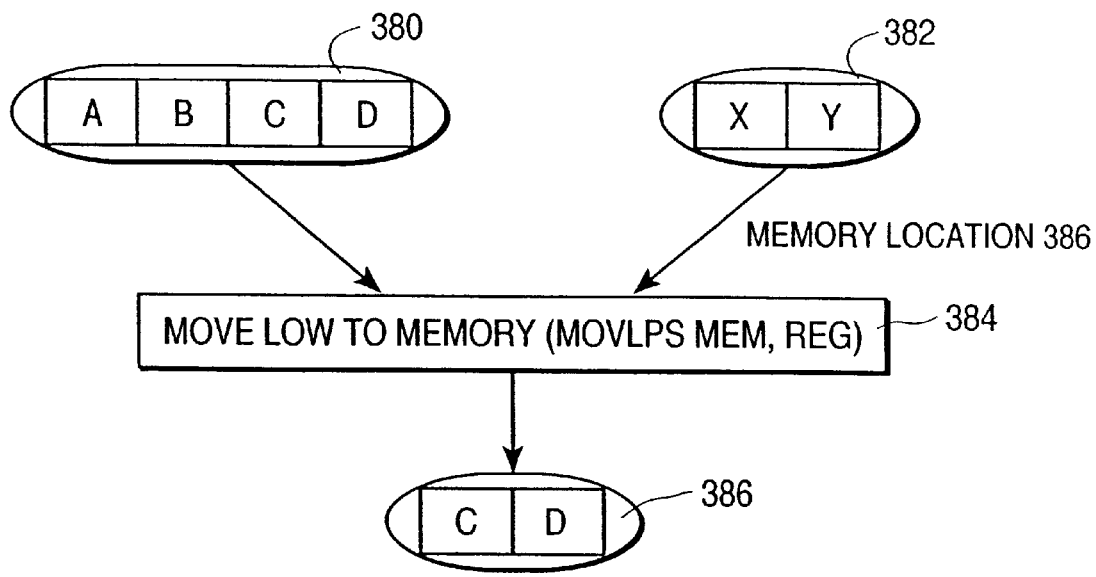
FIG_3H
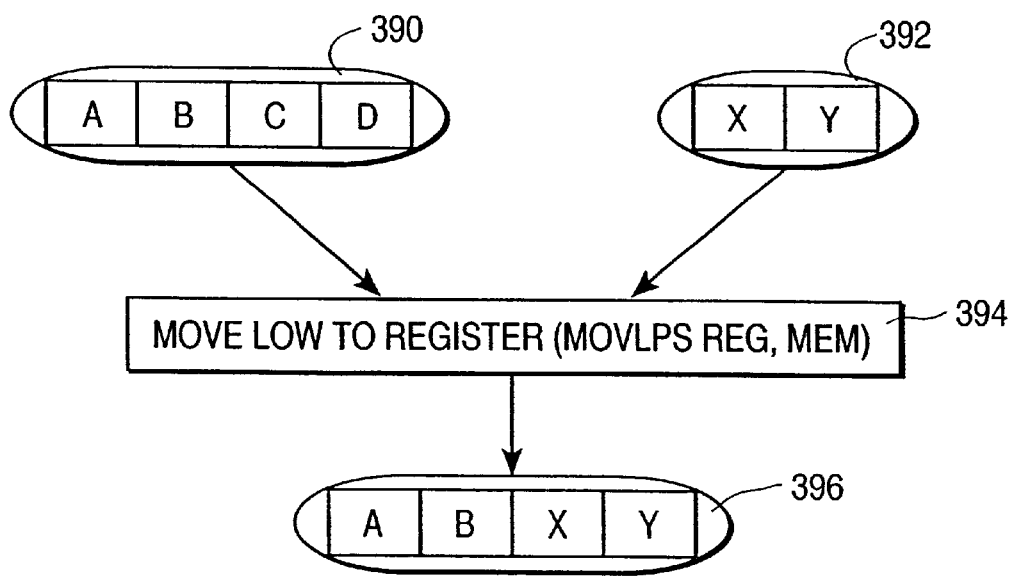
FIG_3I $$\underline{P} = \underline{A} * \underline{F} = \begin{bmatrix} Px \\ Py \\ Pz \\ Pw \end{bmatrix}$$

$$\underline{P} = \begin{bmatrix} X1 & X2 & X3 & X4 \\ Y1 & Y2 & Y3 & Y4 \\ Z1 & Z2 & Z3 & Z4 \\ W1 & W2 & W3 & W4 \end{bmatrix} \begin{bmatrix} Fx \\ Fy \\ Fz \\ Fw \end{bmatrix} = \begin{bmatrix} X1*Fx + X2*Fy + X3*Fz + X4*Fw \\ Y1*Fx + Y2*Fy + Y3*Fz + Y4*Fw \\ Z1*Fx + Z2*Fy + Z3*Fz + Z4*Fw \\ W1*Fx + W2*Fy + W3*Fz + W4*Fw \end{bmatrix}$$

FIG_4A $$A' = \begin{array}{cccc} X1 & Y1 & Z1 & W1 \\ X2 & Y2 & Z2 & W2 \\ X3 & Y3 & Z3 & W3 \\ X4 & Y4 & Z4 & W4 \end{array}$$ ROW-MAJORED $$F = \begin{array}{cccc} FX & FX & FX & FX \\ FY & FY & FY & FY \\ FZ & FZ & FZ & FZ \\ FW & FW & FW & FW \end{array}$$ REPLICATED FORMAT $$P = \begin{array}{cccc} PX & PY & PZ & PW \end{array}$$ RESULT DATA TRIPLES

FIG. 4C $$A = \begin{array}{cccc} X1 & X2 & X3 & X4 \\ Y1 & Y2 & Y3 & Y4 \\ Z1 & Z2 & Z3 & Z4 \\ W1 & W2 & W3 & W4 \end{array}$$ COLUMN-MAJORED $$F = \begin{array}{cccc} FX & FY & FZ & FW \end{array}$$ DATA TRIPLES $$P = \begin{array}{cccc} PX & PY & PZ & PW \end{array}$$ RESULT DATA TRIPLES

FIG. 4B (PRIOR ART)

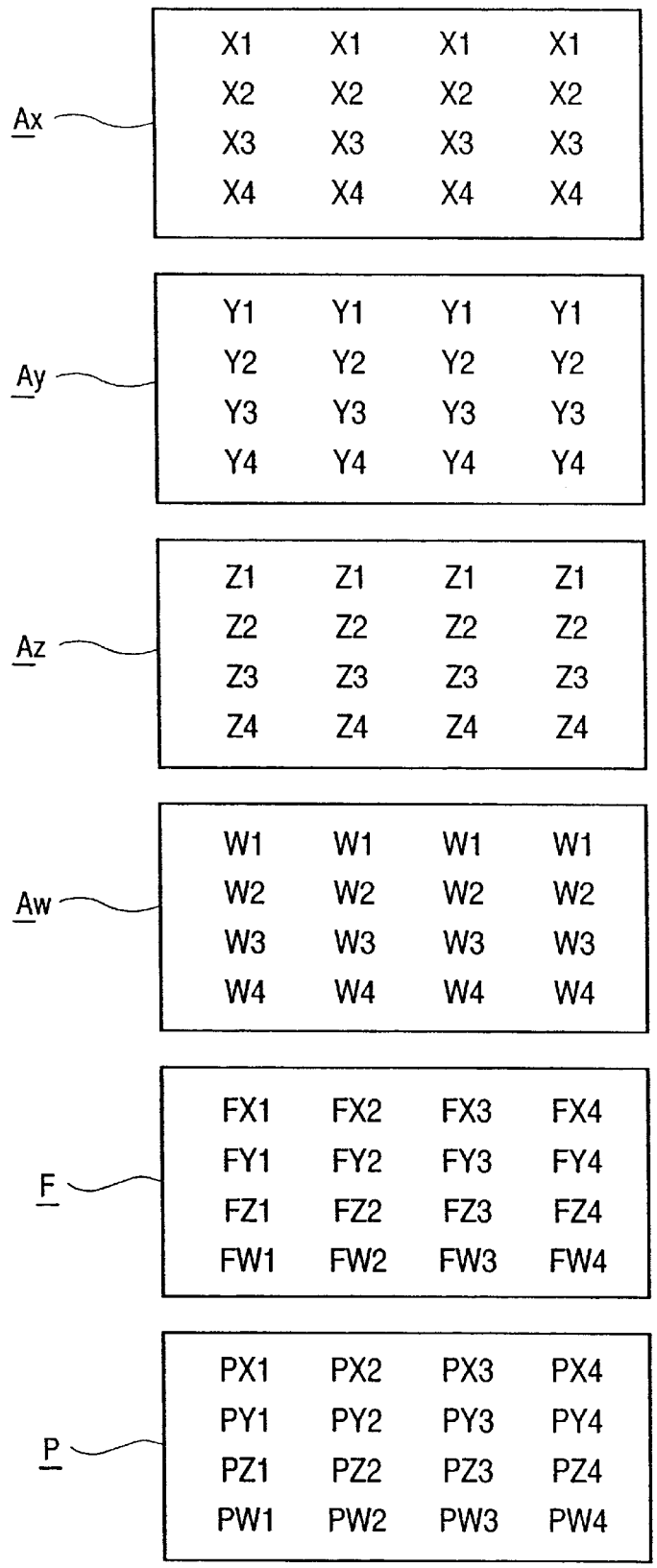
FIG_4D

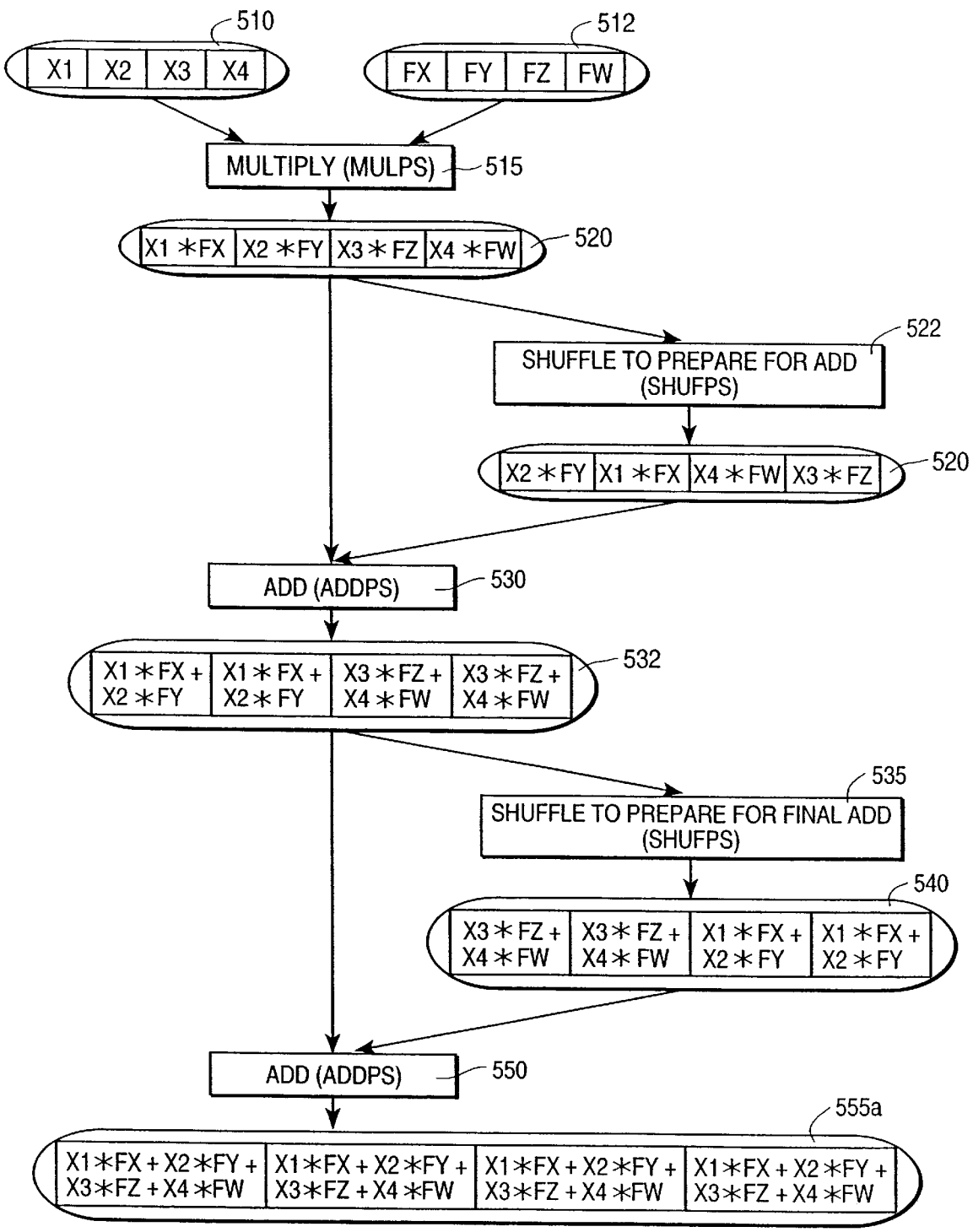
FIG_5A

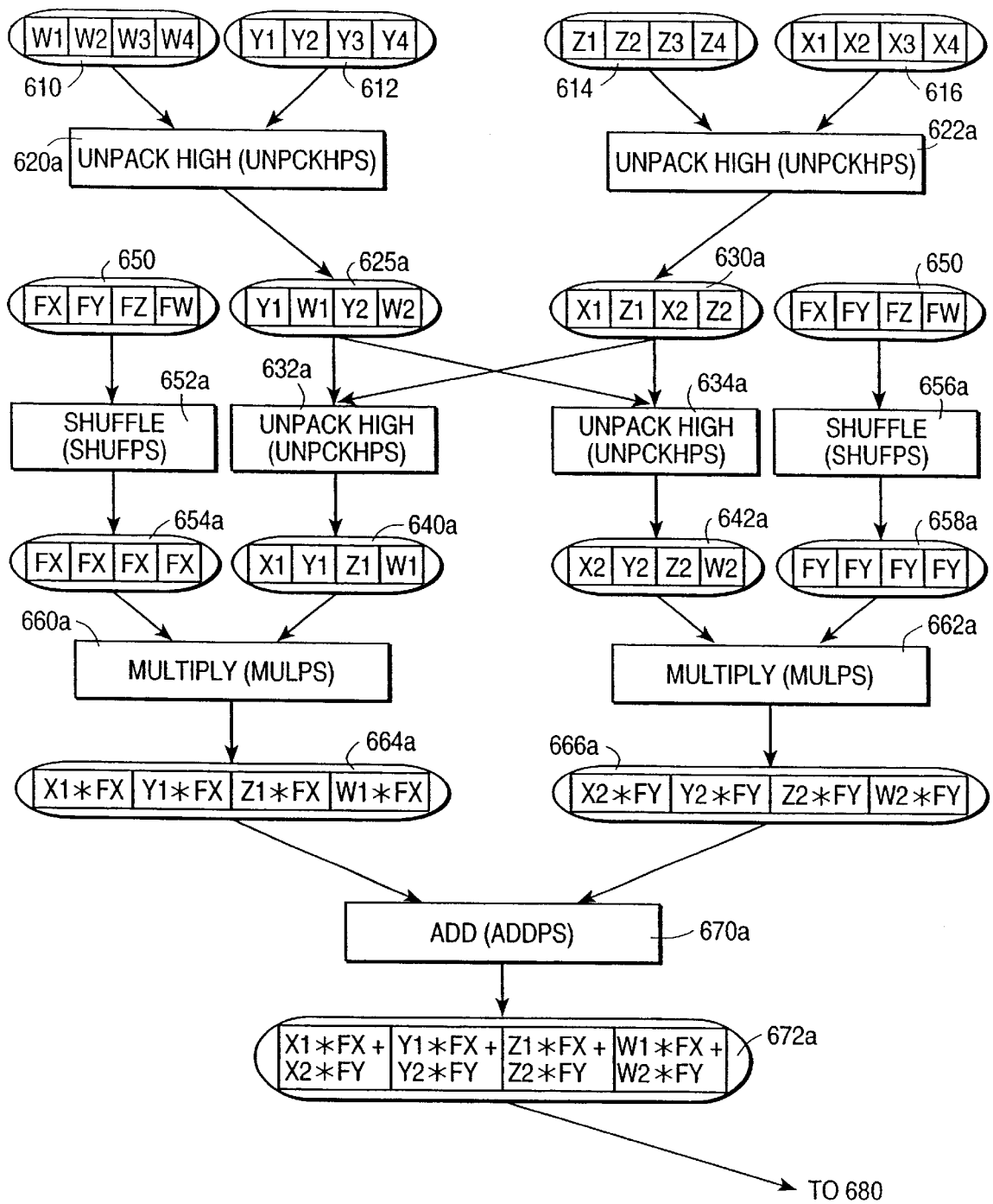
FIG_6A

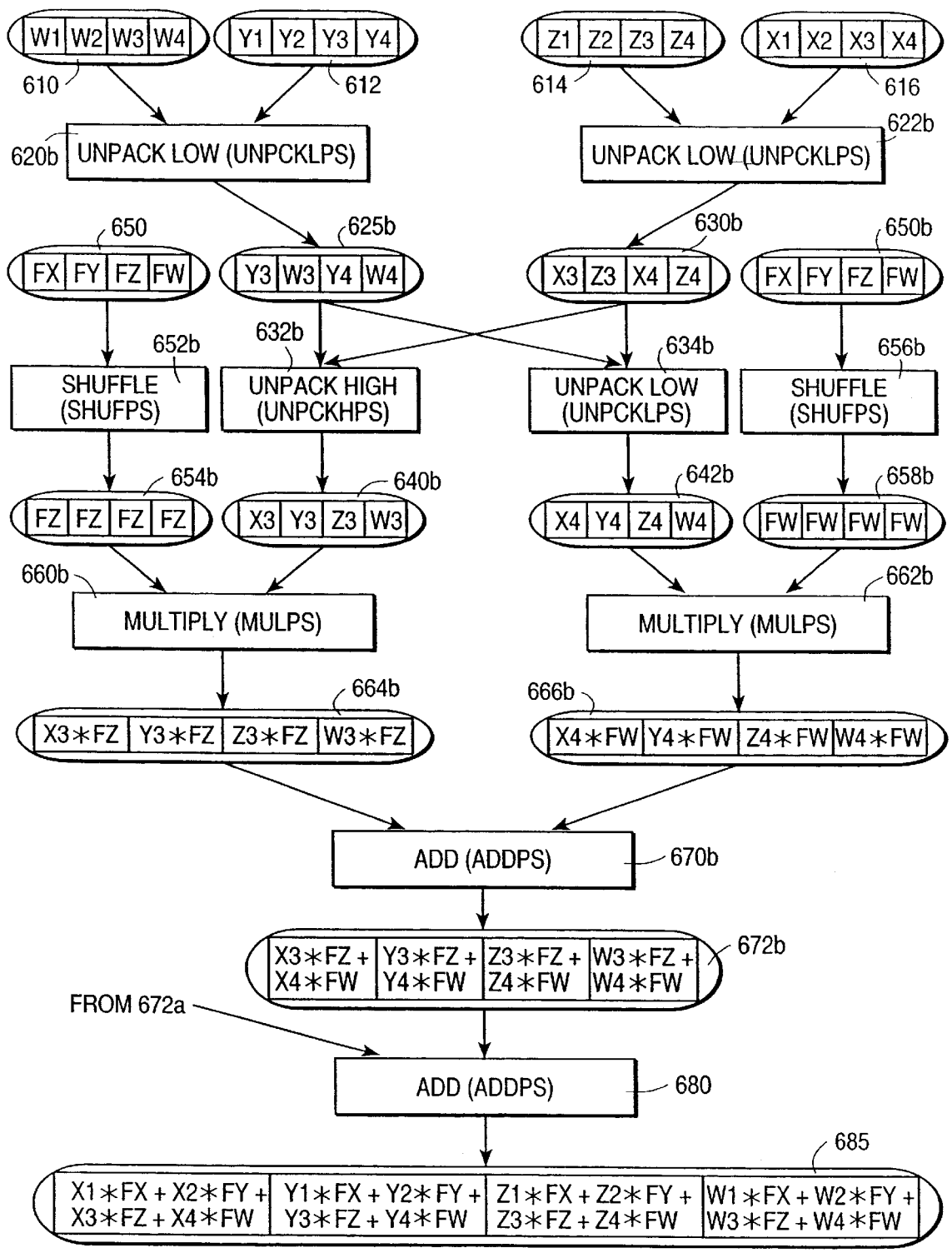
FIG_6B

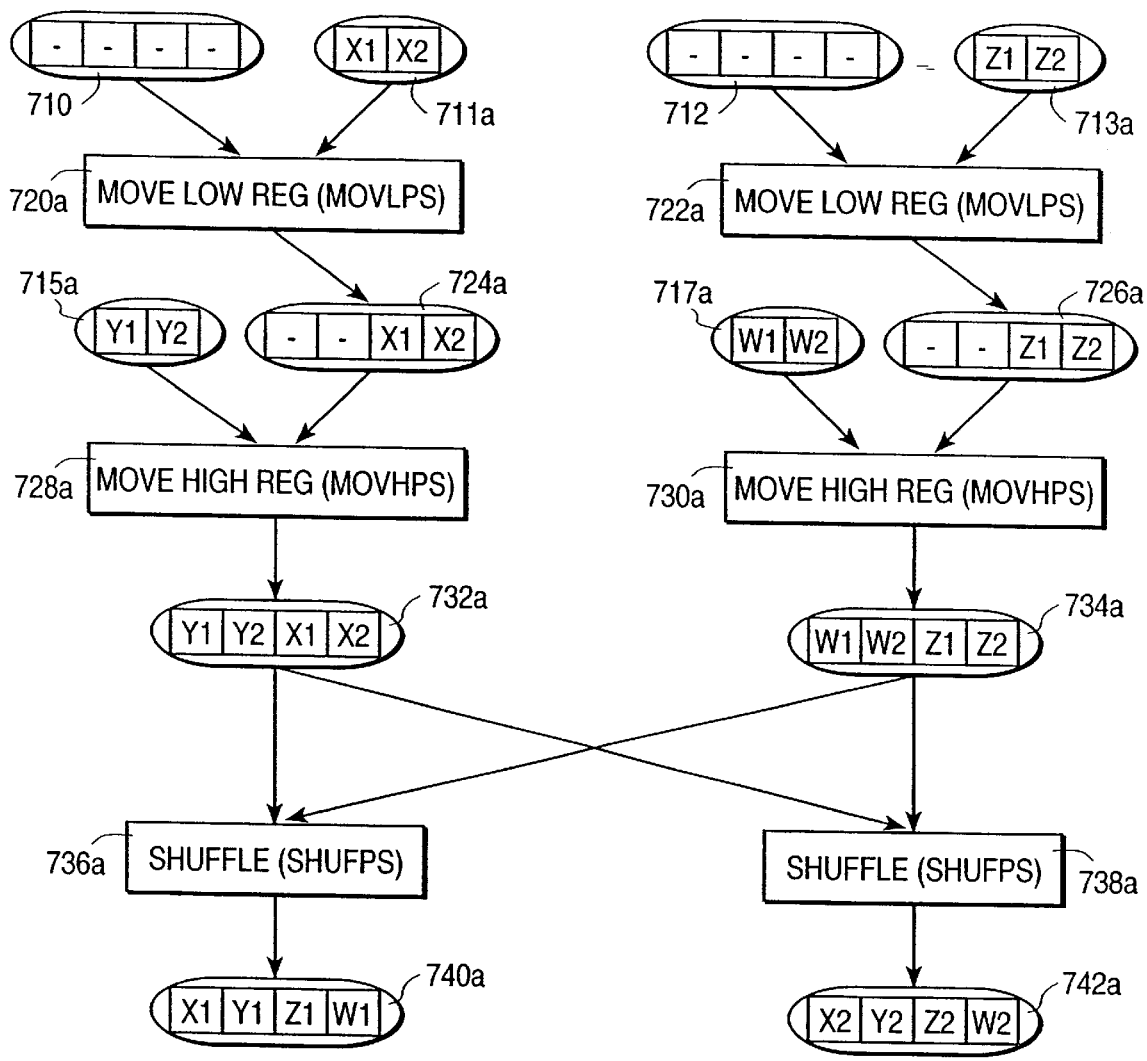
FIG_7A

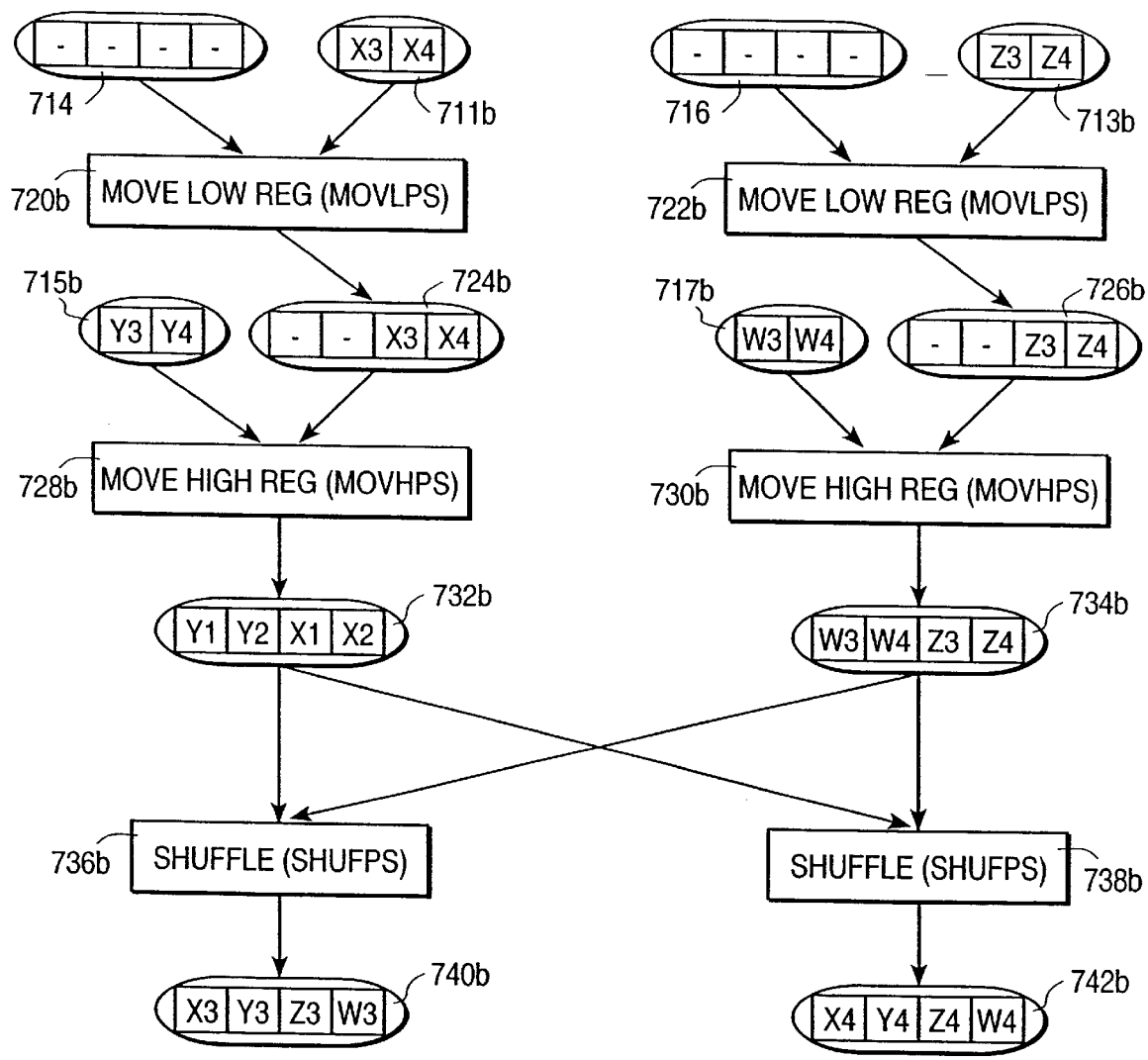
FIG_7B

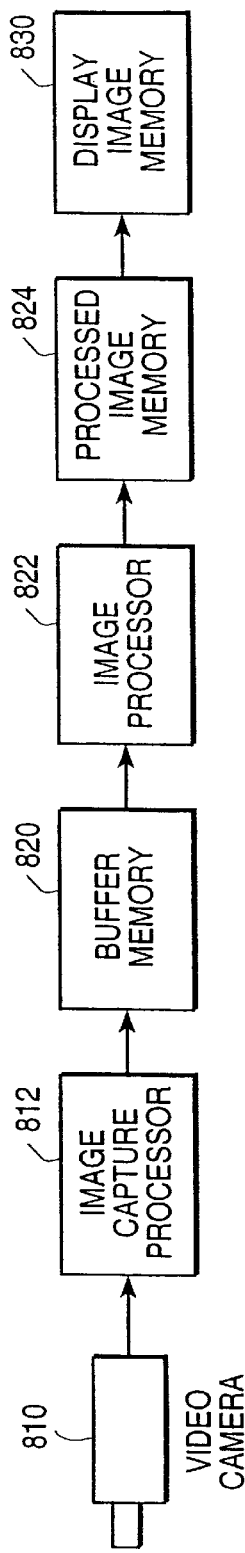
FIG._8A
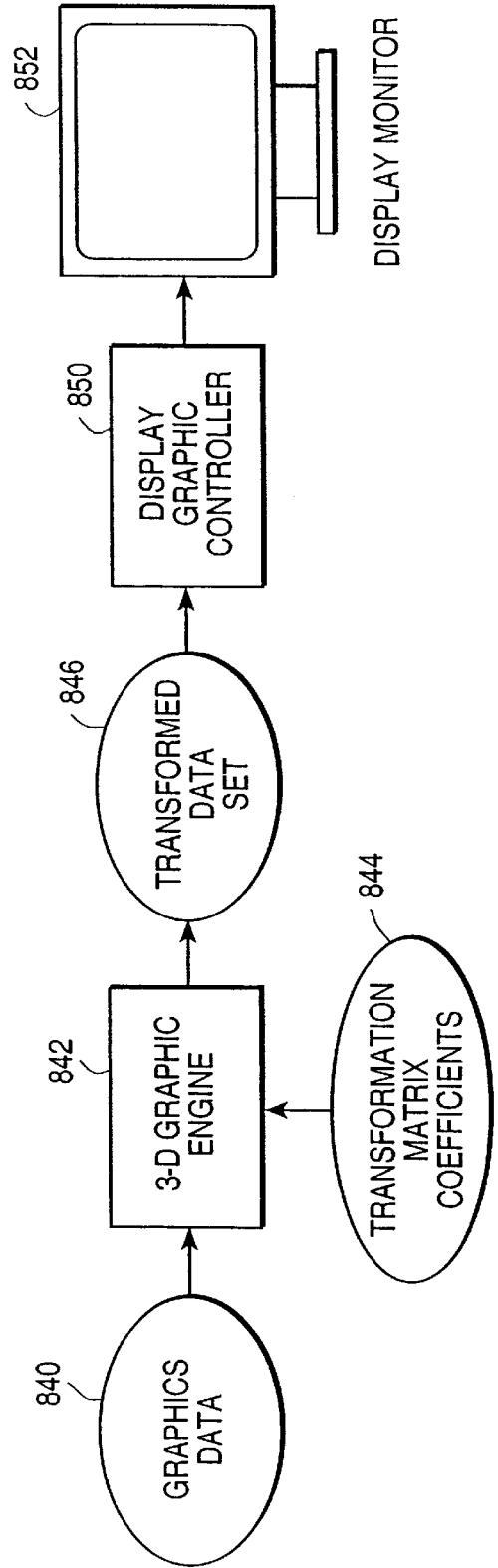
FIG._8B

METHOD AND APPARATUS FOR CONVERTING DATA FORMAT TO A GRAPHICS CARD

BACKGROUND OF THE INVENTION

1. Field of the Invention

This invention relates in general to the field of computer systems, and in particular, to a method and apparatus for performing vertical parallel computations and data format conversion for graphics.

2. Description of Related Art

To improve the efficiency of multi-dimensional computations, Single-Instruction, Multiple Data (SIMD) architectures have been developed. A typical SIMD architecture enables one instruction to operate on several operands simultaneously. In particular, SIMD architectures take advantage of packing many data elements within one register or memory location. With parallel hardware execution, multiple operations can be performed with one instruction, resulting in significant performance improvement. Traditional SIMD architectures perform mainly "vertical" operations where corresponding elements in separate operands are operated upon in parallel and independently.

Although many applications currently in use can take advantage of such vertical operations, there are a number of important applications which would require the re-arrangement of the data elements before vertical operations can be implemented so as to provide realization of the application. Examples of such applications include the dot product and matrix multiplication operations, which are commonly used in 3-D graphics and signal processing applications.

In three-dimensional (3-D) graphics applications, the graphic processor usually renders a graphic object based on a set of graphical data. There are situations where the graphical data are presented to the graphic processor in a data format that is not compatible with the format as processed by the graphic processor.

Therefore, there is a need in the technology for providing an apparatus and method to efficiently perform vertical SIMD computations and data format conversion for 3-D graphic transformations.

SUMMARY OF THE INVENTION

An apparatus and method for performing conversion of graphical data format is disclosed. A matrix multiplication is performed on a first set of data and a second set of data to generate a third set of data in a first format. The first and second sets of data represent the graphical data. The third set of data in the first format is transmitted to a graphics card. The third set of data in the first format is converted to a converted set of data in a second format.

BRIEF DESCRIPTION OF THE DRAWINGS

The features and advantages of the invention will become apparent from the following detailed description of the invention in which:

FIG. 1 is a diagram illustrating one embodiment of a computer system in accordance with the teachings of the invention.

FIG. 2 illustrates a parallel vertical SIMD operation according to one embodiment of the invention.

FIG. 3A illustrates the operation of a multiply packed single instruction according to one embodiment of the invention.

FIG. 3B illustrates the operation of an unpack high packed single instruction according to one embodiment of the invention.

FIG. 3C illustrates the operation of an unpack low packed single instruction according to one embodiment of the invention.

FIG. 3D illustrates the operation of a two-source shuffle packed single instruction according to one embodiment of the invention.

FIG. 3E illustrates the operation of a single-source shuffle packed single instruction according to one embodiment of the invention.

FIG. 3F illustrates the operation of a move high packed single to memory instruction according to one embodiment of the invention.

FIG. 3G illustrates the operation of a move high packed single to register instruction according to one embodiment of the invention.

FIG. 3H illustrates the operation of a move low packed single to memory instruction according to one embodiment of the invention.

FIG. 3I illustrates the operation of a move low packed single to register instruction according to one embodiment of the invention.

FIG. 4A illustrates a matrix multiplication operation.

FIG. 4B illustrates the storage of the data elements in the matrix multiplication according to one embodiment of the invention.

FIG. 4C illustrates the storage of the data elements in the matrix multiplication in a dynamically reorganized manner according to one embodiment of the invention.

FIG. 4D illustrates the data format for a multiple vertical matrix multiplication.

FIG. 5A illustrates a technique to compute an element of the result of the matrix multiplication according to one embodiment of the invention.

FIG. 6A illustrates a technique to compute the first half of the matrix multiplication by dynamic data re-organization according to one embodiment of the invention.

FIG. 6B illustrates a technique to compute the second half of the matrix multiplication by dynamic data organization according to one embodiment of the invention.

FIG. 7A illustrates a technique to generate the first two columns of a 4×4 matrix by dynamic data re-organization according to one embodiment of the invention.

FIG. 7B illustrates a technique to generate the last two columns of a 4×4 matrix by dynamic data organization according to one embodiment of the invention.

FIG. 8A is a general block diagram illustrating the use of an image processor with SIMD capability for processing image data according to one embodiment of the invention.

FIG. 8B is a general block diagram illustrating the use of a 3-D graphic engine with SIMD capability for processing graphic data according to one embodiment of the invention.

DESCRIPTION OF THE PRESENT INVENTION

Figure 5B:
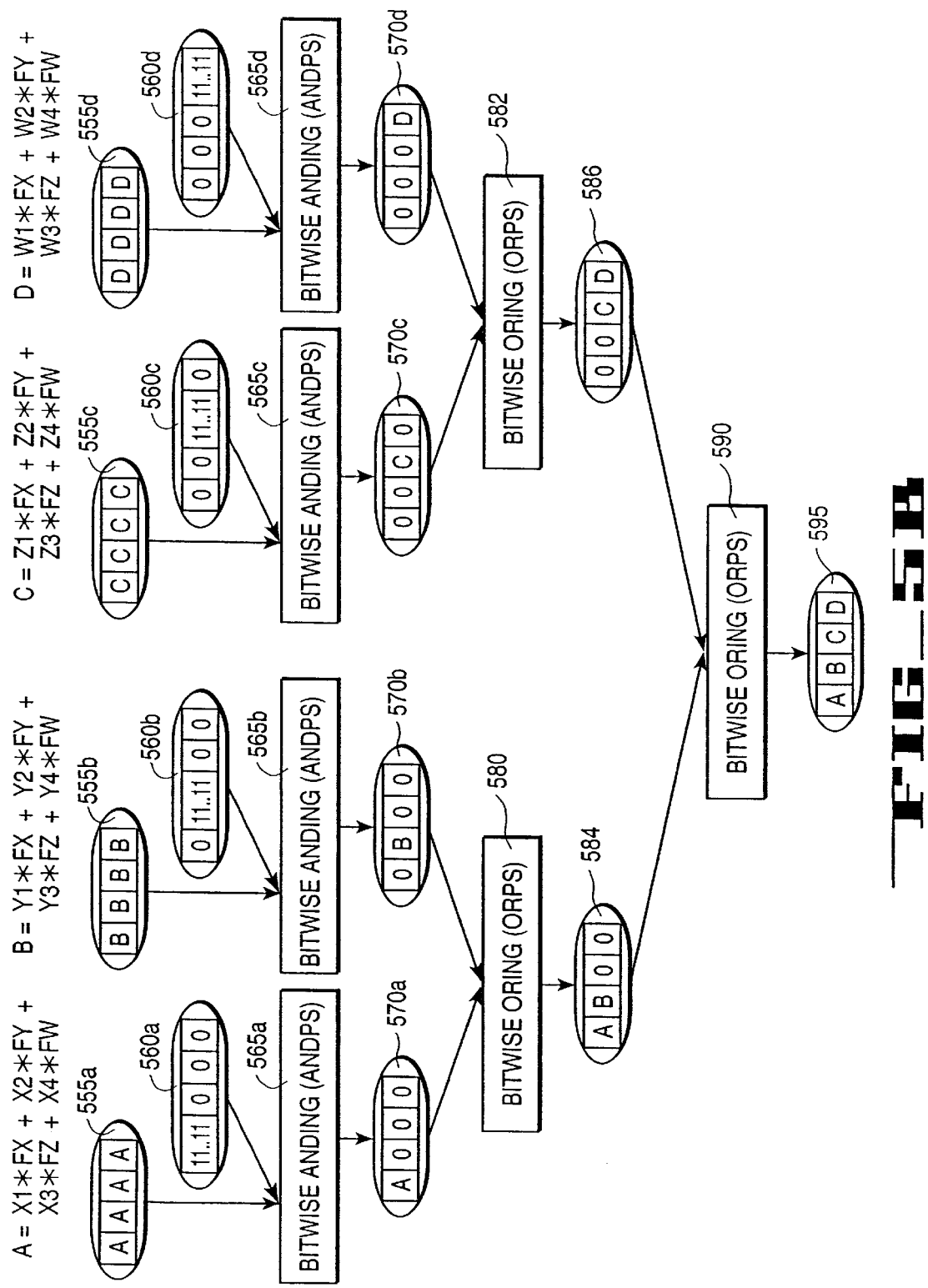
FIG. 5B illustrates a technique to combine the four elements into one element as the final result of the matrix multiplication according to one embodiment of the invention.

A method and apparatus for performing parallel vertical SIMD computations and data format conversion for graphics is disclosed. In one embodiment, parallel operations are performed followed by horizontal add operations. In another embodiment, dynamic data re-organization is performed to prepare data for parallel vertical SIMD operations and to convert the data format. In another embodiment, data are pre-organized and parallel operations are performed directly. The present invention, therefore, discloses alternatives for SIMD computations to achieve optimal performance according to specific applications.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

FIG. 1 is a diagram illustrating one embodiment of a computer system 100 in accordance with the teachings of the present invention. Computer system 100 comprises a processor 110, a storage device 120, and a bus 115. The processor 110 is coupled to the storage device 120 by the bus 115. In addition, a number of user input/output devices 140 (e.g., keyboard, mouse) are also coupled to the bus 115. The processor 110 represents a central processing unit of any type of architecture, such as CISC, RISC, VLIW, or hybrid architecture. In addition, the processor 110 could be implemented on one or more chips. The storage device 120 represents one or more mechanisms for storing data. For example, the storage device 120 may include read only memory (ROM), random access memory (RAM), magnetic disk storage mediums, optical storage mediums, flash memory devices, and/or other machine-readable mediums. The bus 115 represents one or more buses (e.g., AGI), PCI, ISA, X-Bus, VESA, etc.) and bridges. While this embodiment is described in relation to a single processor computer system, the invention could be implemented in a multi-processor computer system.

In addition to other devices, one or more of a network controller 155, a TV broadcast signal receiver 160, a fax/modem 145, a video capture card 135, and an audio card 150 may optionally be coupled to bus 115. The network controller 155 represents one or more network connections (e.g., an ethernet connection). While the TV broadcast signal receiver 160 represents a device for receiving TV broadcast signals, the fax/modem 145 represents a fax and/or modem for receiving and/or transmitting analog signals representing data. The image capture card 135 represents one or more devices for digitizing images (i.e., a scanner, camera, etc.). The audio card 150 represents one or more devices for inputting and/or outputting sound (e.g., microphones, speakers, magnetic storage devices, optical storage devices, etc.). A graphics controller card 130 is also coupled to the bus 115. The graphics controller 130 represents one or more devices for generating images (e.g., graphics card).

FIG. 1 also illustrates that the storage device 120 has stored therein data 124 and program code 122. Data 124 represents data stored in one or more of the formats described herein. Program code 122 represents the necessary code for performing any and/or all of the techniques in the present invention. In particular, the program code 122 contains sequence of instructions to perform efficient vertical SIMD computations including matrix multiplication and data format conversion. Of course, the storage device 120 preferably contains additional software (not shown), which is not necessary to understanding the invention.

FIG. 1 additionally illustrates that the processor 110 includes a decode unit 116, a set of registers 114, an execution unit 112, and an internal bus 111 for executing instructions. Of course, the processor 110 contains additional circuitry, which is not necessary to understanding the invention. The decode unit 116, registers 114 and execution unit 112 are coupled together by the internal bus 111. The decode unit 116 is used for decoding instructions received by processor 110 into control signals and/or microcode entry points. In response to these control signals and/or microcode entry points, the execution unit 112 performs the appropriate operations. The decode unit 116 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The decode unit 116 is shown including packed data instruction set 118 for performing operations on packed data. In one embodiment, the packed data instruction set 118 includes the following instructions: a store state, a restore state, a move, a multiply, an add, a square root, a shuffle, a square root reciprocal, an AND bitwise, and an OR bitwise operations. The number format for these operations can be any convenient format, including single-precision, double-precision, and extended floating-point numbers, signed and unsigned integers, and non-numeric data. In a preferred embodiment, the arithmetic operations use a single-precision 32 bit floating-point number format However, the arithmetic instructions may be applied to integer data as well. Furthermore, in one embodiment, the processor 110 is a superscalar pipelined processor capable of completing one or more of these packed data instructions per clock cycle (ignoring any data dependencies and pipeline freezes). In addition to the packed data instructions, the processor 110 can include new instructions and/or instructions similar to or the same as those found in existing general purpose processors. For example, in one embodiment the processor 110 supports an instruction set which is compatible with the Intel Architecture instruction set used by existing processors, such as the Pentium® processor manufactured by Intel Corporation of Santa Clara, Calif. Alternative embodiments of the invention may contain more or less, as well as different, packed data instructions and still utilize the teachings of the invention.

The registers 114 represent a storage area on processor 110 for storing information, including control/status information, integer data, floating point data, and packed data. It is understood that aspects of the invention are the described instruction set for operating on packed data, as well as how those instructions are used. According to these aspects of the invention, the storage area used for storing the packed data is not critical. The term data processing system is used herein to refer to any machine for processing data, including the computer systems(s) described with reference to FIG. 1.

FIG. 2 illustrates a parallel operation according to one embodiment of the present invention. In one embodiment, the operation, denoted by the operator "o", involves two operands, a first operand 210 and a second operand 220, to produce a result 230. The term "operand" is interchangeably used herein to refer to the data on which an instruction operates or the storage area (e.g., register, memory location, etc.) in which that data can be found. Each of the operands 210 and 220 is a packed data item, comprising four separate data elements, each data element is 32-bit wide for a total operand size of 128-bit. In one embodiment, each data element in a packed data item is a floating-point number. In another embodiment, each data element in a packed data item is an integer number. It will be appreciated by one skilled in the art that any number of data elements in each operand and any data element size for each data element can be utilized. It will be further appreciated by one skilled in the art that the data element sizes in each operand may be different.

In the embodiment shown in FIG. 2, the first operand 210 is 128-bit wide, having four data elements: $A_0$, $A_1$, $A_2$, and $A_3$. Each of the data elements $A_0$, $A_1$, $A_2$, and $A_3$ is 32-bit wide. Similarly, the second operand 220 is 128-bit wide, having 4 data elements: $B_0$, $B_1$, $B_2$, and $B_3$. Each of the data elements $B_0$, $B_1$, $B_2$, and $B_3$ is 32-bit wide. The operation "o" operates on these four pairs of data elements in parallel to produce the four independent result elements in the result 230: $A_0$ o $B_0$, $A_1$ o $B_1$, $A_2$ o $B_2$, and $A_3$ o $B_3$. Each of these result data elements is 32-bit wide.

The operation "o" may be any operation that can be performed on multiple operands (all in parallel, serially data element by data element, pairs of data elements in parallel, etc.) in response to executing a single instruction. Examples of the operation "o" include add, subtract, multiply, divide, bitwise logical operations (e.g., AND, OR, XOR).

Basic SIMD Operations

The number format for the data elements in the packed data items can be any convenient format, including single-precision, double-precision, and extended floating-point numbers, signed and unsigned integers, and nonnumeric data. In a preferred embodiment, the number format is single precision 32-bit floating-point number. However, any number format can be used. In the following, the descriptor "packed single" refers to the packed single precision floating-point number. In addition, a packed data item contains multiple elements. Each of these elements occupy a position, or a location, in the packed data item. For ease of reference, the most significant location is referred to as the first location, etc.

FIG. 3A illustrates the operation of a multiply packed single instruction (MULPS) according to one embodiment of the invention. In one embodiment, data items are represented by ovals, while instructions or operations are represented by rectangles. In another embodiment, storage areas containing the data items are represented by ovals, while circuits or hardware elements are represented by rectangles.

In FIG. 3A, the data elements A, B, C, and D, of a first operand 310 are multiplied with the respective E, F, G, and H packed data elements of a second operand 312 to generate a result 316. For example, data element A of the first operand 310 is multiplied with the corresponding data element E of the second operand 312 to produce the result A*E stored in the corresponding location of result 316.

Other operations are performed in a similar manner as the above multiply packed single instruction. Some operations may involve one operand, while others may involve two operands. Examples of these operations are: move aligned packed single (MOVAPS), divide packed single (DIVPS), add packed single (ADDPS), subtract packed single (SUBPS), square root packed single (SQRTPS), square root reciprocal packed single (RSQRTPS), reciprocal packed single (RCPPS), bitwise logical AND for single (ANDPS), bitwise logical OR for single (ORPS), bitwise logical XOR for single (XORPS). Any other arithmetic and logical operations (e.g, complementation, negation, NAND, NOR, XNOR or equivalence) can also be used.

FIG. 3B illustrates the operation of an unpack high packed single instruction (UNPCKHPS) according to one embodiment of the invention. The high portion of a first operand 320, having four data elements A B C D, and the high portion of a second operand 322, having four data elements E F G H, are unpacked and interleaved to form a result data item 326. In the illustrative example of FIG. 3B, the two data elements A and B of the high portion of the first operand 320 and the two data elements E and F of the high portion of the second operand 322 are unpacked and interleaved to form the four data elements of the result 326 organized as A E B F in that order.

FIG. 3C illustrates the operation of an unpack low packed single instruction (UNPCKLPS) according to one embodiment of the invention. The low portion of a first operand 330, having four data elements A B C D, and the low portion of a second operand 332, having four data elements E F G H, are unpacked and interleaved to form a result data item 336. In the illustrative example of FIG. 3C, the two data elements C and D of the low portion of the first operand 330 and the two data elements G and H of the low portion of the second operand 332 are unpacked and interleaved to form the four data elements of the result data item 336 organized as C G D H in that order.

FIG. 3D illustrates the operation of a two-source shuffle packed single instruction (SHUFPS) according to one embodiment of the invention. The shuffle operation 344 essentially merges a portion of a first packed data item with a portion of a second packed data item to produce a result packed data item. The data elements of a first operand 340 are shuffled to occupy the high portion of a result data item 346. The data elements of a second operand 342 are shuffled to occupy the low portion of the result data item 346. In the illustrative example of FIG. 3D, any of the four data elements A, B, C, and D of the first operand 340 can be stored in any of the two high locations of the result data item 346. Similarly, any of the four data elements E, F, G, and H of the second operand 342 can be stored in any of the two low locations of the result data item 346. Some examples of the organization of the result data item 346 after the two-source shuffle single operation are B C E H, A A F F, A B E E, A D G E.

FIG. 3E illustrates the operation of a single-source shuffle packed single instruction (SHUFPS) according to one embodiment of the invention. The shuffle operation 352 essentially performs a permutation on the data elements in the packed data item. The data elements of an operand 350 are shuffled to occupy any location of a result data item 354. In one embodiment, the operand 350 and the result data item 354 correspond to the same register or memory location. In the illustrative example of FIG. 3E, any of the four data elements A, B, IC, and D of the operand 350 can be stored in any of the locations of the result 354. Some examples of the organization of the result data item 354 after this shuffle single operation are A A A A, A B D C, D C B A, A D A B.

FIG. 3F illustrates the operation of a move high packed single to memory instruction (MOVHPS mem, reg) according to one embodiment of the invention. The move high packed single to memory operation 364 essentially transfers the high portion of the packed operand to the memory. The high data elements of an operand 360 are transferred to occupy the memory operand 362 to produce the result data item 366. The operand 362 is located in the same memory location as the operand 366. The memory operand 362 and the result data item 366 are of half the size of the operand 360. In the illustrative example of FIG. 3F, the data elements A and B of the operand 360 are transferred to replace the data elements X and Y, respectively, of the memory operand 362 to produce the memory data item 366.

FIG. 3G illustrates the operation of a move high packed single to register instruction (MOVHPS reg, mem) according to one embodiment of the invention. The move high packed single to register operation 374 essentially transfers the memory to the high portion of the packed operand while leaving the low portion of the packed operand unchanged. The data elements of a memory operand 372 are transferred to occupy the high portion of an operand 370 to produce the result data item 376. The memory operand 372 is of half the size of the operand 370. In the illustrative example of FIG. 3G, the data elements X and Y of the memory operand 372 are transferred to replace the data elements A and B, respectively, while leaving the data elements C and D unchanged in the operand 370 to produce the result data item 376.

FIG. 3H illustrates the operation of a move low packed single to memory instruction (MOVLPS mem, reg) according to one embodiment of the invention. The move low packed single to memory operation 384 essentially transfers the low portion of the packed operand to the memory. The low data elements of an operand 380 are transferred to occupy the memory operand 382 to produce the result data item 386. The operand 382 is located in the same memory location as the operand 386. The memory operand 382 and the result data item 386 are of half the size of the operand 380. In the illustrative example of FIG. 3F, the data elements C and D of the operand 380 are transferred to replace the data elements X and Y, respectively, of the memory operand 382 to produce the memory data item 386.

FIG. 3I illustrates the operation of a move low packed single to register instruction (MOVHPS reg, mem) according to one embodiment of the invention. The move low packed single to register operation 394 essentially transfers the memory to the low portion of the packed operand while leaving the high portion of the packed operand unchanged. The data elements of a memory operand 392 are transferred to occupy the high portion of an operand 390 to produce the result data item 396. The memory operand 392 is of half the size of the operand 390. In the illustrative example of FIG. 3I, the data elements X and Y of the memory operand 392 are transferred to replace the data elements C and D, respectively, while leaving the data elements A and B unchanged in the operand 390 to produce the result data item 396.

Matrix Multiplication and Format Conversion

FIG. 4A illustrates a matrix multiplication operation. In this illustrative example, matrices A and F are multiplied together to produce a matrix P. Matrix A is organized as a 4×4 matrix. Matrix F is a column vector, organized as 4×1. Matrix P is a column vector, organized as 4×1.

Since scalar versions of matrix multiplication are in the prior art, there is a base of code, data and hardware available that utilize a data format (referred to herein as the data triples format) conducive to these scalar matrix multiplication techniques. In particular, FIG. 4B illustrates the prior art data triples data format. As illustrated in FIG. 4B, the matrix A is stored in a column-majored format (i.e., the elements $X_i$, $X_{i+1}$, $X_{i+2}$, $X_{i+3}$ are stored sequentially), the column vector F in a row-majored format (i.e., the elements Fx, Fy, Fz, Fw are stored sequentially), and the results (column vectors P) are provided in the row-majored format.

Three SIMD techniques for performing matrix multiplication are described herein: a horizontal add method, a vertical matrix multiplication with dynamic data re-organization method, and a vertical matrix multiplication with static data pre-organization method. The horizontal add method is advantageous in that it utilizes the data triples format and generates the data triples format. Therefore, the horizontal add method is compatible with existing data, routines and hardware. However, the horizontal add method requires that the data elements in a single packed data item be summed (referred to as a horizontal add or intra-add operation).

Since the horizontal add method requires horizontal operations and SIMD instructions tend to perform vertical operations (see FIG. 2), different matrix multiplication methods (referred to herein as the dynamic data re-organization method and the static data pre-organization method) that do not require horizontal operations can be advantageous. Embodiments of a dynamic data re-organization method and a static data pre-organization method are later described herein with reference to FIGS. 6A–B, 7A–B and 8A–C. While the dynamic data re-organization requires the same data triples format as input, the static data pre-organization method requires a different data format than the data triples format.

In particular, FIG. 4C illustrates the format as produced in the intermediate steps of the dynamic data re-organization method according to one embodiment of the invention. FIG. 4C shows a matrix A', replicated elements from column vector F, and column vector P. In comparison to FIG. 4B, the matrix A is transposed to generate the matrix A' in FIG. 4C; each element of the column vector F has been replicated in it own packed data item (referred to as the replicated format); and the column vector P is the same. Therefore, if the data is provided in the prior art data triples format, the data will have to be dynamically reorganized to perform the vertical matrix multiplication methods (see FIGS. 6A–6B). However, the output is in the data triples format acceptable to the exiting receiving entities (e.g., graphics cards).

The static data pre-organization method does not perform the format conversion on the fly, but rather it requires the data to be in the format as shown in FIG. 4C, i.e., the matrix A'. Since no format conversion is performed, this method produces the highest performance, but it requires the input to be in the specified format.

Format Conversion:

One aspect of the present invention is the conversion of the data formats for graphics applications. The above discussion for a single column vector F is readily extended to multiple column vectors F's. The multiple column vectors F's represent multiple data points or vertices that are to be transformed based on the transformation matrix A. Each vertex Fi having the components ($Fx_i$, $Fy_i$, $Fz_i$, $Fw_i$) is transformed into a transformed vertex $P_i$ having the components ($Px_i$, $Py_i$, $Pz_i$, $Pw_i$).

In the matrix multiplication P=A F. the transformation matrix A is typically the same for all vertices, i.e., all vertices are subject to the same transformation. This matrix A usually contain the components of the transformations such as translation, rotation, and scaling. Other transformations may also be employed, e.g., affine transformation. The number of column vectors $F_i$ corresponds to the number of data points or vertices that are to be transformed. In practice, this number could be quite large. It is therefore important to process these data points as fast as possible.

Since the transformation matrix A is constant throughout the transformation process of N data points $F_i$ (i=1, . . . ,N), it is advantageous to keep the matrix A in a replicated format and dynamically re-organize the format of the data points or vertices $F_i$'s. FIG. 4D illustrates an example of this process.

As shown in FIG. 4D, the transformation matrix A is stored in a replicated format with 4 replicated matrices Ax, Ay, Az, and Aw which store the replicated x, y, z, and w components of the matrix A, respectively. The matrix F stores multiple column vectors Fi representing the data points or vertices. For simplicity, the matrix F is shown to contain four column vectors. Of course, the number of columns in the matrix F could be any number. As shown in FIG. 4D, the data format of the matrix F is column-majored. If the data format of the input vectors to be stored in F is data triples, then they will be re-organized dynamically by the dynamic data reorganization technique described later.

As shown in FIG. 4D, the result matrix P contains column vector $P_i$'s corresponding to column vectors $F_i$'s as follows:

$$Px_1 = X1*Fx_1 + X2*Fy_1 + X3*Fz_1 + X4*Fw_1$$

$$Px_2 = X1*Fx_2 + X2*Fy_2 + X3*Fz_2 + X4*Fw_2$$

As shown in FIG. 4D, the data format of the matrix P is column-majored. This data format can be converted to be compatible with receiving units (e.g., graphic card or other routines) as discussed below.

The individual vertices $P_i$'s are displayed on a display screen or passed to other functions or routines for further processing. Prior to displaying, additional graphic rendering operations may be performed such as shading, coloring, and pseudo-coloring. The transformation of the multiple column vectors may be performed by a high performance microprocessor with parallel data packed capabilities like the processor 110 shown in FIG. 1. The results of the transformation stored in matrix P are delivered to a graphic card for further processing or displaying.

While the rows in FIGS. 4B–C are shown in somewhat of a contiguous fashion, the rows need not be stored continuously. However, the disclosed embodiments are most efficient when the elements in each row are stored contiguously and are stored such that each row can be accessed as a packed data item. Of course, the data could be stored in any format and reorganized as it is processed.

Horizontal Add Computation

A matrix multiplication of the 4×4 matrix A and the 4×1 column vector F results in a 4×1 column vector P. In one embodiment, the matrix multiplication is performed to generate the result elements one at a time. This involves four sequences of operations, each sequence corresponding to each result element. In each sequence, the corresponding row of the matrix A is multiplied with the column vector F using the multiply packed single instruction which operates in parallel. Then a horizontal add operation is performed on the elements. In one embodiment, a horizontal add instruction is provided to perform the horizontal add operation. In an alternate embodiment, the horizontal add operation is achieved by two shuffle packed single operations, each followed by a (vertical) add operation. The sum from the horizontal add is positioned at the appropriate location in the result so that in the end, the four sums are merged together to form a final result having all four elements of the matrix P. An exemplary code sequence or circuit diagram is illustrated in FIG. 5A. The final merging operation is illustrated in FIG. 5B.

FIG. 5A illustrates a technique to compute an element of the result of the matrix multiplication according to one embodiment of the invention. FIG. 5A shows a first packed data element 510 storing data elements representing the one of the four rows of the matrix A. In this illustrative example, the first row of the matrix A is used. The first packed data item 510 has 4 data elements X1, X2, X3, and X4, corresponding to the first row of the matrix A, each containing 32-bits. FIG. 5A also shows a second packed data item 512 storing data elements representing the column vector F. The second packed data item 512 has four data elements Fx, Fy, Fz, and Fw, each containing 32-bits.

As shown by step 515, a multiply packed single instruction is performed on the first packed data item 510 and the second packed data item 512 to generate a third packed data item 520. The third packed data item 520 has four data elements (X1*Fx, X2*Fy, X3*Fz, and X4*Fw), each containing 32-bits and representing the product of the corresponding elements in the first packed data item 510 and the second packed data item 512.

At step 522, the third packed data item 520 is shuffled to generate a fourth packed data item 525 in preparation for a horizontal add. The shuffle operations switch the data elements in the high and low portions of the third packed data item 520. As a result of this shuffle operation, the fourth packed data item 525 has four elements (X2*Fy, X1*Fx, X4*Fw, X3*Fz), each containing 32-bits.

At step 530, the third packed data item 520 is added to the fourth packed data item 525 to generate a fifth packed data item 532. The fifth packed data item 532 has four data elements, each containing 32-bits. The high portion contains two identical data elements, X1*Fx+X2*Fy, and the low portion contains two identical elements, X3*Fz+X4*Fw.

At step 535, the fifth packed data item 532 is shuffled to generate a sixth packed data item 540 in preparation for a final add. The shuffle operation swaps the low portion and the high portion of the fifth packed data item 532. As a result of this shuffle operation, the sixth packed data item 540 has four data elements, (X3*Fz+X4*Fw, X3*Fz+X4*Fw, X1*Fx+X2*Fy, X1*Fx+X2*Fy), each containing 32-bits.

At step 550, the fifth packed data item 532 is added to the sixth packed data item 540 to generate a seventh packed data item 555A. The seventh packed data item 555A has 4 identical data elements, X1*FX+X2*Fy+X3*Fz+X4*Fw, each containing 32-bits. The result in the packed data item 555A represents the first element of the product column vector P. The remaining three data elements of the product column vector P are generated in a similar manner.

FIG. 5B illustrates a technique to combine the four elements into one element as the final result of the matrix multiplication according to one embodiment of the invention. FIG. 5B shows four packed data items 555A, 555B, 555C, and 555I) as generated by the code sequences as illustrated in FIG. 5A. The seventh, eighth, ninth, and tenth packed data items 555A, 555B, 555C, and 555I:) represent the first, second, third, and fourth rows, respectively, of the product column vector P. The merging is performed by four masking operations and two successive bitwise ORing operations. Other techniques to perform the merging are possible. For example, merging can be carried out by two-source shuffle operations.

FIG. 5B shows a mask packed data item 560A used to mask out the seventh packed data item 555A. In this masking operation, the data elements at the second, third and fourth locations are forced to zero while the data element at the first location is allowed to pass through. The mask pattern contains all 1's in the first location and 0's in the other locations. At step 565A, the seventh packed data item 555A is ANDed with the mask packed data item 560A on a bit-by-bit basis to generate a packed data item 570A. The packed data item 570A has 4 elements, each containing 32-bits. The first data element is X1*Fx+X2*Fy+X3*Fz+ X4*Fw, and the other three data elements are 0's. The packed data item 570A is then merged with the other 3 packed data items as will be explained later.

Similarly, FIG. 5B also shows mask packed data items 560B, 560C, and 560D are respectively used to mask out the packed data items 555B, 555C, and 555D. In these masking operations (steps 565B, 565C, and 565D), the data elements at the second, third, and fourth locations of the packed data items 555B, 555C, and 555D, respectively, are allowed to pass through, while all other locations are forced to zero. The results of these mask operations (570B, 570C, and 570D) are merged with the packed data item 570A.

The merging of the packed data elements 570A, 570B, 570C, and 570D is now performed. At step 580, the packed data item 570A is bitwise ORed with the packed data item 570B to generate a packed data item 584. The packed data item 584 has four data elements: the first element is X1*FX+ X2*Fy+X3*Fz+X4*Fw, the second element is Y1*Fx+ Y2*Fy+Y3*Fz+Y4*Fw, and the third and fourth elements are zero.

At step 582, the packed data item 570C is bitwise ORed with the packed data item 570D to generate a packed data item 586. The packed data item 586 has four data elements: the first and second elements are zero, the third element is Z1*FX+Z2*Fy+Z3*Fz+Z4*Fw, and the fourth element is W1*Fx+W2*Fy+W3*Fz+W4*Fw.

At step 590, the packed data item 584 is bitwise ORed with the packed data item 586 to generate the final packed data item 595. The packed data item 595 has four data elements, each is 32-bits: the first element is X1*Fx+ X2*Fy+X3*Fz+X4*Fw, the second element is Y1*Fx+ Y2*Fy+Y3*Fz+Y4*Fw, the third element is Z1*Fx+ Z2*Fy+Z3*Fz+Z4*Fw, and the fourth element is W1*FX+ W2*Fy+W3*Fz+W4*Fw. The packed data item 595 thus represents the result column vector P.

This horizontal add computation technique processes one element at a time. In graphic applications such as in three-dimensional (3-D) geometrical transformation, each row may correspond to a component of a vertex. This technique processes each component at a time. For comparison purposes, ignoring the data movement operations, this technique includes the following operations:

For one vertex: 2 shuffles, 2 adds, and 1 multiply.
For four result components: 8 shuffles, 8 adds, and 4 multiplies.
For merging: 4 bitwise ANDing, 3 bitwise ORing.

As seen from FIG. 5A, the horizontal add technique incurs extra computational slots. The data item 555A in FIG. 5A shows 4 identical data elements, only one of which is useful. The computational slots are:

For one vertex: 5 slots.
For four result components: 20 slots.
For merging: 7 slots.

The total number of computational slots is 32×4=128. In general, let L be the overall latency of the operation, this technique requires 4 computational slots, each producing the same result. Therefore, to produce 4 separate results requires a net latency per slot of 4*L. For operations involving long latency, this net latency per slot is not desirable. Examples of long latency operations include the normalization operation, commonly used in 3-D graphics. The normalization requires the computation of a reciprocal square root (i.e., 1/sqrt) which needs a division and a square root operations. The division and square root operations are long latency operations.

Dynamic Data Re-Organization

The dynamic data re-organization technique reads the date elements of the matrix A and re-organizes or re-arranges the data elements for vertical parallel computations. The re-organization of the data elements can be performed dynamically (i.e., on the fly) so that the data can be stored in a normal order (i.e., row-majored). The re-organization essentially re-arranges the data elements in column-majored order so that parallel multiplications and additions can be performed without the need to emulate a horizontal add, or intra-add, operation. The data re-organization essentially performs a transposition of a matrix by interchanging the rows and the columns. The advantages of this technique over the horizontal add technique include faster processing time because all vertices are operated at the same time. In one embodiment, the dynamic data re-organization is performed by utilizing the unpack instructions. In another embodiment, the dynamic data reorganization is performed by the partial move instructions.

In the illustrative example of a matrix multiplication of a 4×4 matrix and a 4×1 column vector, the dynamic data re-organization technique rearranges the data in two stages. The first stage involves the re-arrangement of the first two columns and the second stage involves the re-arrangement of the last two columns.

Using Unpack Instructions:

FIG. 6A illustrates a technique to compute the first half of the matrix multiplication by dynamic data re-organization using unpack instructions according to one embodiment of the invention. FIG. 6A shows the four packed data items 610, 612, 614, and 616, representing the four rows of the matrix A, and the packed data item 650 representing the data elements of the column vector F. The packed data item 610 stores the four data elements W1, W2, W3, and W4, each containing 32-bits. The packed data item 612 stores the four data elements Z1, Z2, Z3, and Z4, each containing 32-bits. The packed data item 614 stores the four data elements Y1, Y2, Y3, and Y4, each containing 32-bits. The packed data item 616 stores the four data elements X1, X2, X3, and X4, each containing 32-bits. The packed data item 650 stores the four data elements Fx, Fy, Fz, and Fw, each containing 32-bits.

At step 620A, the high portions of the two packed data items 610 and 612 are unpacked and interleaved to generate a packed data item 625A. The packed data item 625A stores four data elements Y1, W1, Y2 and W2, each containing 32-bits.

At step 622A, the high portions of the two packed data items 614 and 616 are unpacked and interleaved to generate a packed data item 630A. The packed data item 630A stores four data elements X1, Z1, X2 and Z2, each containing 32-bits.

At step 632A, the high portions of the two packed data items 625A and 630A are unpacked and interleaved to generate a packed data item 640A. The packed data item 640A stores four data elements X1, Y1, Z1 and W1, each containing 32-bits, representing the first column of the matrix A.

At step 634A, the low portions of the two packed data items 625A and 630A are unpacked and interleaved to generate a packed data item 642A. The packed data item 642A stores four data elements X2, Y2, Z2 and W2, each containing 32-bits, representing the second column of the matrix A.

At step 652A, the packed data item 650 is shuffled to generate a packed data item 654A. The packed data item 654A replicates the first data element in the packed data item 650A to store 4 identical elements Fx. At step 656A, the packed data item 650A is shuffled to generate a packed data item 658A. The packed data item 658A replicates the second data element in the packed data item 650A to store 4 identical elements Fy.

At step 660A, the packed data item 640A is multiplied with the packed data item 654A using the multiply packed single instruction to generate a packed data item 664A. The packed data item 664A stores the four product elements: X1*Fx, Y1*Fx, Z1*FX, W1*Fx, each containing 32-bits. At step 662A, the packed data item 642A is multiplied with the packed data item 658A using the multiply packed single instruction to generate a packed data item 666A. The packed data item 666A stores the four product elements: X2*Fy, Y2*Fy, Z2*Fy, W2*Fy, each containing 32-bits.

At step 670A, the packed data item 664A is added to the packed data item 666A using the add packed single instruction to generate a packed data item 672A. The packed data item 672A stores 4 data elements: X1*Fx+X2*Fy, Y1*FX+Y2*Fy, Z1*Fx+Z2*Fy, and W1*FX+W2*Fy, each containing 32-bits. The packed data item 672A is then used in step 680 shown in FIG. 6B.

FIG. 6B illustrates a technique to compute the second half of the matrix multiplication by dynamic data re-organization according to one embodiment of the invention. FIG. 6B shows the four packed data items 610, 612, 614, and 616, representing the four rows of the matrix A, and the packed data item 650 representing the data elements of the column vector F as shown in FIG. 6A.

At step 620B, the high portions of the two packed data items 610 and 612 are unpacked and interleaved to generate a packed data item 625B. The packed data item 625B stores four data elements Y3, W3, Y4 and W4, each containing 32-bits.

At step 622B, the high portions of the two packed data items 614 and 616 are unpacked and interleaved to generate a packed data item 630B. The packed data item 630B stores four data elements X3, Z3, X4 and Z4, each containing 32-bits.

At step 632B, the high portions of the two packed data items 625B and 630B are unpacked and interleaved to generate a packed data item 640B. The packed data item 640B stores four data elements X3, Y3, Z3 and W3, each containing 32-bits, representing the third column of the matrix A.

At step 634B, the low portions of the two packed data items 625B and 630B are unpacked and interleaved to generate a packed data item 642B. The packed data item 642B stores four data elements X4, Y4, Z4 and W4, each containing 32-bits, representing the fourth column of the matrix A.

At step 652B, the packed data item 650B is shuffled to generate a packed data item 654B. The packed data item 654B replicates the third data element in the packed data item 650B to store 4 identical elements Fz. At step 656B, the packed data item 650B is shuffled to generate a packed data item 658B. The packed data item 658B replicates the fourth data element in the packed data item 650B to store 4 identical elements Fw.

At step 660B, the packed data item 640B is multiplied with the packed data item 654B using the multiply packed single instruction to generate a packed data item 664B. The packed data item 664B stores the four product elements: X3*Fx, Y3*Fx, Z3*Fx, W3*Fx, each containing 32-bits. At step 662B, the packed data item 642B is multiplied with the packed data item 658B using the multiply packed single instruction to generate a packed data item 666B. The packed data item 666B stores the four product elements: X4*Fy, Y4*Fy, Z4*Fy, W4*Fy, each containing 32-bits.

At step 670B, the packed data item 664B is added to the packed data item 666B using the add packed single instruction to generate a packed data item 672B. The packed data item 672B stores 4 data elements: X3*Fz+X4*Fw, Y3*Fz+Y4*Fw, Z3*Fz+Z4*Fw, and W3*Fz+W4*Fw, each containing 32-bits.

At step 680, the packed data item 672B is added to the packed data item 672A in FIG. 6A to generate a final result packed data item 685. The packed data item 685 represents the product vector P. The packed data item 685 has four data elements: the first element is X1*Fx+X2*Fy+X3*Fz+X4*Fw, the second element is Y1*Fx+Y2*Fy+Y3*Fz+Y4*Fw, the third element is Z1*Fx+Z2*Fy+Z3*Fz+Z4*Fw, and the fourth element is W1*Fx+W2*Fy+W3*Fz+W4*Fw.

Using Partial Move Instructions:

FIGS. 7A and 7B illustrate a technique to re-organize the data in row-majored format to column-majored format (or vice versa) using the partial move instructions. FIG. 7A corrresponds to the first two rows (or columns) and FIG. 7B corresponds to the last two rows (or columns). For simplicity and clarity, FIGS. 7A and 7B only show the result of the matrix transposition. The remaining calculations, including the multiplies and adds, are the same as in the technique using the unpack instructions discussed above.

FIGS. 7A and 7B show the eight packed data items 711A and 711B, 713A and 713B, 715A and 715B, and 717A and 717B, representing the four rows of the matrix A. These packed data items are assumed to be stored in memory. The packed data items 711A, 711B, 713A, 713B, 715A, 715B, 717A, and 717B store the pairs of data elements (X1, X2), (X3, X4), (Z1, Z2), (Z3, Z4), (Y1, Y2), (Y3, Y4), (W1, W2), and (W3, W4), respectively.

FIGS. 7A and 7B also show the four packed data items 710, 712, 714, and 716. These packed data items are the registers, each containing four data elements. Initially, the contents of these packed data items are don't cares and represented by the dashes in FIGS. 7A and 7B.

At step 720A, the packed data item 711A is moved to the low portion of the packed data item 710 to generate a packed data item 724A. Similarly, at step 722A, the packed data item 713A is moved to the low portion of the packed data item 712 to generate a packed data item 726A.

At step 728A, the packed data item 715A is moved to the high portion of the packed data item 724A to generate a packed data item 732A. The packed data item 732A now stores four data elements Y1, Y2, X1, and X2. Similarly, at step 730A, the packed data item 717A is moved to the high portion of the packed data item 726A to generate a packed data item 734A. The packed data item 734A now stores four data elements W1, W2, Z1, and Z2.

At step 736A, the two packed data items 732A and 734A are shuffled to generate a packed data item 740A. The packed data item 740A now stores the first column of the matrix A having the data elements X1, Y1, Z1, and W1. Similarly, at step 738A, the two packed data items 732A and 734A are shuffled to generate a packed data item 742A. The packed data item 742A now stores the second column of the matrix A having the data elements X2, Y2, Z2, and W2.

The generation of the third and fourth columns of the matrix A is similarly shown in Figure B. At steps 720B and 722B, the packed data items 711B and 713B are moved to the low portions of the packed data items 714 and 716 to generate packed data items 724B and 726B, respectively. At steps 728B and 730B, the packed data items 715B and 717B are moved to the high portions of the packed data items 724B and 726B to generate packed data items 732B and 734B, respectively. Finally, at steps 736B and 738B, the packed data items 732B and 734B; are shuffled to generate packed data items 740B and 742B. The packed data item 740B now stores the third column of the matrix A having the data elements X3, Y3, Z3, and W3. The packed data item 742B now stores the fourth column of the matrix A having the data elements X4, Y4, Z4, and W4.

The four packed data items 740A, 742A, 740B and 742B now store the four columns of the matrix A. The remaining calculations for the matrix multiplication are performed in a similar manner as discussed above.

Compared to the technique that uses the unpack instructions, the partial move technique essentially provides comparable performance. In the unpack technique, the matrix transposition requires four 128-bit unpacks. In the partial move technique, the matrix transposition requires four 64-bit moves and two 128-bit shuffles. Assuming four 64-bit moves are equivalent to two 128-bit unpacks and two 128-bit shuffles are equivalent to two 128-bit unpacks, it is apparent that the two techniques provide comparable performance.

The dynamic data re-organization technique processes all four vertices at the same time. For comparison purposes, ignoring the data movement operations, this technique requires the following operations: 8 unpack (both high and low) operations, 4 shuffles, 4 multiplies, and 3 adds. Comparing with the horizontal add technique, this technique provides a significant advantage in processing time. In addition, if the operations are of long latency, the dynamic data re-organization technique produces a much smaller net latency. With this technique, each of the 4 computational slots produces a unique result. Therefore the net latency is L/4 where L is the overall latency of the operation.

Another advantage of the dynamic data re-organization technique, whether implemented by the unpack or partial move instructions, is the flexibility to generate only the results that are needed. For example, in 3-D graphics, the W components are usually ignored. Therefore, only 3 components are needed. The dynamic data re-organization technique allows the computation of the needed 3 components, saving 25% of processing time.

Static Data Pre-Organization

If the data elements of the matrix A have been pre-organized in column-majored order, then the steps 620A, 622A, 632A, and 634A in FIG. 6A and the steps 620B, 622B, 632B, and 634B in FIG. 6B, are not necessary. In addition, if the column vector F is stored in replicated format, i.e., each data element is replicated as in packed data items 654A, 658A in FIG. 6A and packed data items 654B and 658B in FIG. 6B, then the steps 652A and 656A in FIG. 6A and 652B and 656B in FIG. 6B are not necessary.

In this embodiment, the matrix multiplication can be performed by four multiply operations (corresponding to steps 660A and 662A in FIG. 6A, and 660B and 662B in FIG. 6B), two add operations (corresponding to step 670A and step 670B in FIG. 6A and FIG. 6B, respectively), and one final add operation (corresponding to step 680 in FIG. 6B).

The static data pre-organization technique even saves the processing time further by eliminating the unnecessary unpacking and shuffle operations in the dynamic data re-organization technique. The static data pre-organization technique processes all four vertices at the same time. For comparison purposes, ignoring the data movement operations, this technique requires the following operations: 4 multiplies and 3 adds. However, this technique requires that the data be arranged in accordance to some specified format.

Applications

The vertical SIMD computations are used in many applications involving the processing of multiple data elements. Examples of these applications include image processing, three-dimensional graphics, and multi-dimensional data manipulations.

Image Processing:

FIG. 8A is a general block diagram illustrating the use of an image processor with SIMD capability for processing image data according to one embodiment of the present invention. FIG. 8A shows a video camera 810, an image capture processor 812, a buffer memory 820, an image processor 822, a processed image memory 824, and a display image memory 830.

The video camera 810 acquires the image information of a scene and generates a video signal which represents the intensity level or color of the pixels of the image. The image capture processor 812 captures the video signal and digitizes the video signal into digital data. The buffer memory 820 stores the digital data representing the captured image. The image processor 822 processes the digital data stored in the buffer memory.

In one embodiment, the computer system 100 is used to implement the image processor 822. The image processor 822 may comprise a processor with SIMD capabilities as described earlier and a memory that stores a program for processing the image data.

The processed image memory 824 stores the result of the image processing operations as performed by the image processor 822. The display image memory 830 stores the graphic data information that corresponds to the processed image for display.

3-D Graphic Processor:

FIG. 8B is a general block diagram illustrating the use of a 3-D graphic engine with SIMD capability for processing graphic data according to one embodiment of the present invention. FIG. 8B shows a 3-D graphic engine 842, a display graphic controller 850, and a display monitor 852.

The 3-D graphic engine 842 receives the graphic data 840 and the transformation matrix coefficients 844. The 3-D graphic engine 842 performs 3-D transformation in a manner similar to the matrix multiplication as illustrated earlier.

In one embodiment, the computer system 100 is used to implement the 3-D graphic engine. The 3-D graphic engine 842 may comprise a processor with SIMD capabilities as described earlier and a memory that stores a program for processing the graphic data. As discussed earlier, a format conversion may be necessary to convert the data format as delivered by the processor to the graphic engine 842.

The 3-D graphic engine 842 generates a transformed data set 846. The transformed data set 846 represents the result of the 3-D transformation. The data set 846 is then read by the display graphic controller 850 to display the transformed graphic data on the display monitor 852.

Figure 8C:
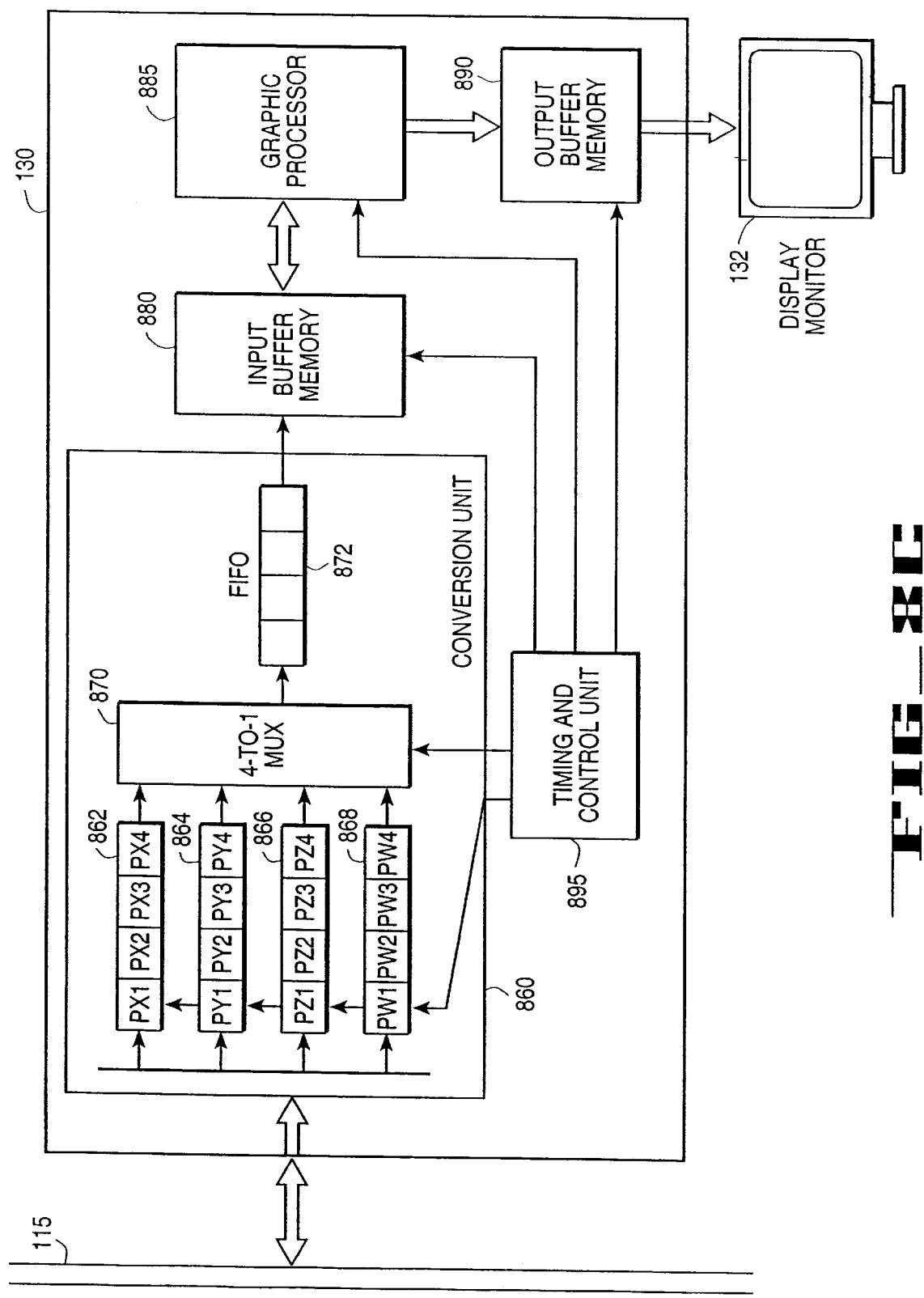
FIG. 8C is a diagram illustrating a graphic controller with a conversion unit according to one embodiment of the invention.

Format Conversion to a Graphics Card:

FIG. 8C is a diagram illustrating a graphic controller 130 with a conversion unit according to one embodiment of the invention. The graphic controller card 130 includes a conversion unit 860, a timing and control unit 895, an input buffer memory 880, a graphic processor 885, and an output buffer memory 890. The graphics controller card 130 receives graphic data sent by the processor 110 as shown in FIG. 1.

The graphic processor 885 may be a dedicated graphic processor with special architecture and instruction to perform graphic operations, or a general-purpose high performance microprocessor. The graphic processor 885 may process the data points in the data triples format or in the column-majored format. If the format of the transformed data points $P_i$'s delivered by the processor 110 is the same as the input format expected by the graphic engine, no format conversion is necessary. However, if the two formats are different, for example the processor 110 delivers a data triples format while the graphic engine expects column-majored format or the processor 110 delivers a column-majored format while the graphic engine expects a data triples format, a format conversion is necessary.

This format conversion can be performed in a number of ways. In one embodiment shown in FIG. 8C, the format conversion is carried out by the conversion unit 860 in the graphic controller card 130. In another embodiment, the format conversion is carried out by a routine executed by the graphic processor 885. Yet, in another embodiment, the format conversion is performed by the processor 110 before delivering to the graphic controller 130.

The conversion unit 860 includes 4 input First-In-First-Out (FIFO) buffer memories 862, 864, 866, and 868, a four-to-one multiplexer 870, and an output FIFO 872. In the embodiment shown in FIG. 8C, it is assumed that the matrix P is delivered in column-majored format and the graphic processor 885 expects a row-majored format. In other words, the data are deposited as $(PX_4, PY_4, PZ_4, PW_4)$, $(PX_3, PY_3, PZ_3, PW_3)$, $(PX_2, PY_2, PZ_2, PW_2)$, and $(PX_1, PY_1, PZ_1, PW_1)$. The FIFO's 862, 864, 866, and 868 are configured to map to the internal bus receiving the data in a row-majored format. In other words, FIFO 862 receives $(PX_4, PX_3, PX_2, PX_1)$, FIFO 864 receives $(PY_4, PY_3, Py_2, PY_1)$, FIFO 868 receives $(PZ_4, PZ_3, PZ_2, PZ_1)$, and FIFO 484 receives $(PW_4, PW_3, PW_2, PW_1)$. Of course, other data steering logic circuits can be employed. The writing and reading of these FIFO's are controlled by the Timing and Control Circuit 895.

For example, if each data element in the column vector is 32-bit and the processor 110 can deliver 64 bits per write cycle, then the depositing of each column vector takes place in two write cycles. In the first cycle, FIFO's 862 and 864 are enabled to accept data while FIFO's 866 and 868 are disabled. In the second cycle, FIFO's 866 and 868 are enabled and FIFO's 862 and 864 are disabled. The data inputs to FIFO's 862 and 866 are tied together and the data inputs to FIFO's 864 and 868 are tied together.

The multiplexer 870 is a 4-to-1 multiplexer which selects the data read from the four FIFO's to the output FIFO 872. The multiplexing is performed 4 times faster than the writing cycle of the FIFO. In other words, for each FIFO read cycle, there are 4 multiplexing cycles so that all 4 data elements can be read out and merged into the output FIFO 872 in the same input FIFO clock rate. The FIFO 872 is then read out to the input buffer memory 880. If the input buffer memory 880 can accept the data from the FIFO's 862, 864, 866, and 868 directly, then the FIFO 872 may not be necessary.

The Timing and Control Unit 895 generates clock and control signals to the conversion unit 860, the input buffer memory 880, the graphic processor 885, and the output buffer memory 890. The clock signals are used to control and synchronize the operations such as input FIFO write/read, multiplexing, output FIFO write/read, address updating for input and output buffer memories, etc.

The input buffer memory 880 stores the data read out from the FIFO's 862–868 in the row-majored format which is compatible with the graphic processor 885. The graphic processor 885 reads the data out of the input buffer memory 880, performs further rendering operations, and then writes to the output buffer memory 890. The output buffer memory contains the rendered pixels that are ready for displaying. Other graphic elements are not shown such as digital-to-analog converters, color look-up tables (LUTs). The graphic data in the output buffer memory 890 are then delivered to the display monitor 132 for displaying.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:

performing a matrix multiplication on a first set of data and a second set of data to generate a third set of data in a first format, the first and second sets of data representing graphical data;

transmitting the third set of data in said first format to a graphics card; and converting said third set of data in said first format to a converted set of data in a second format;

wherein said first format is row-majored and said second format is column-majored.

2. The method of claim 1 further comprising:

rendering a graphic object from said third set of data; and displaying said graphic object.

3. The method of claim 2, wherein said converting further comprises:

re-arranging the third set of data; and selecting the re-arranged data to generate the converted set of data in the second format.

4. The method of claim 3, wherein said re-arranging transposes the third set of data.

5. The method of claim 2 further comprises:

storing the converted set of data in an input buffer memory; and storing rendered data representing the graphic object in an output buffer memory.

6. The method of claim 5, wherein said first set of data corresponds to vertices of the graphic object rendered by said graphic card.

7. The method of claim 5, wherein said second set of data corresponds to a transformation matrix representing a 3-D graphic transformation.

8. A method comprising:

performing a matrix multiplication on a first set of data and a second set of data to generate a third set of data in a first format, the first and second sets of data representing graphical data;

transmitting the third set of data in said first format to a graphics card; and converting said third set of data in said first format to a converted set of data in a second format;

wherein said first format is column-majored and said second format is row-majored.

9. A computer system comprising:

a bus;

a processor coupled to said bus;

a storage device coupled to said bus having stored therein a sequence of instructions, which when executed by the processor cause the processor to,
perform a matrix multiplication on a first set of data and a second set of data operands to generate a third set of data in a first format, and
transmit the third set on the bus in said first format;

a graphics card coupled to said bus to receive said third set of data in said first format and to render a graphic object from said third set of data; and a display unit coupled to said graphics card to display said graphic object;

wherein said graphics card comprises a conversion unit to convert said third set of data in said first format to a converted set of data in a second format, and wherein said first format is row-majored and said second format is column-majored.

10. The computer system of claim 9, wherein said conversion unit further comprises:

a data steering circuit for re-arranging the third set of data in the second format; and a multiplexer coupled to the data steering circuit for selecting the re-arranged data to generate the converted set of data in the second format.

11. The computer system of claim 9, wherein said graphics card further comprises:

a graphics processor coupled to said conversion unit to receive the converted set of data and to render the graphic object based on said converted set of data.

12. The computer system of claim 9, wherein said graphics card further comprises:

an input buffer memory coupled to the conversion unit and the graphics processor to store the converted set of data; and an output buffer memory coupled to the graphics processor to store rendered data representing the graphic object.

13. The computer system of claim 9, wherein said first set of data corresponds to vertices of the graphic object rendered by said graphic card.

14. The computer system of claim 9, wherein said second set of data corresponds to a transformation matrix representing a 3-D graphic transformation.

15. A computer system comprising:

a bus;

a processor coupled to said bus;

a storage device coupled to said bus having stored therein a sequence of instructions, which when executed by the processor cause the processor to,
perform a matrix multiplication on a first set of data and a second set of data operands to generate a third set of data in a first format, and
transmit the third set on the bus in said first format;

a graphics card coupled to said bus to receive said third set of data in said first format and to render a graphic object from said third set of data; and a display unit coupled to said graphics card to display said graphic object;

wherein said graphics card comprises a conversion unit to convert said third set of data in said first format to a converted set of data in a second format, and wherein said first format is column-majored and said second format is row-majored.

* * * * *

UNITED STATES PATENT AND TRADEMARK OFFICE
CERTIFICATE OF CORRECTION

PATENT NO. : 6,288,723 B1
DATED : September 11, 2001
INVENTOR(S) : Huff et al.

It is certified that error appears in the above-identified patent and that said Letters Patent is hereby corrected as shown below:

Column 2,
Line 23, delete "31", insert -- 3I --.

Column 3,
Line 33, delete "AGI)", insert -- AGP --.

Column 7,
Lines 33 and 43, delete "31", insert -- 3I --.

Column 10,
Line 51, delete "5551)", insert -- 555D --.
Line 53, delete "5551:)", insert -- 555D --.

Signed and Sealed this

Seventh Day of May, 2002

Attest:

JAMES E. ROGAN
Attesting Officer
Director of the United States Patent and Trademark Office